US010796228B2

(12) United States Patent
Roberts et al.

(10) Patent No.: US 10,796,228 B2
(45) Date of Patent: Oct. 6, 2020

(54) MACHINE-LEARNING-BASED PROCESSING OF DE-OBFUSCATED DATA FOR DATA ENRICHMENT

(71) Applicant: Oracle International Corporation, Redwood Shores, CA (US)

(72) Inventors: Tara U. Roberts, Austin, TX (US); Jonathan Stanesby, Wokingham (GB); Michael Pearmain, Merrow (GB); Kevin Yordy, Denver, CO (US); Karen Sutthakorn, Overton (GB)

(73) Assignee: Oracle International Corporation, Redwood Shores, CA (US)

( * ) Notice: Subject to any disclaimer, the term of this patent is extended or adjusted under 35 U.S.C. 154(b) by 107 days.

(21) Appl. No.: 16/007,787

(22) Filed: Jun. 13, 2018

(65) Prior Publication Data

US 2019/0102574 A1  Apr. 4, 2019

Related U.S. Application Data

(60) Provisional application No. 62/566,026, filed on Sep. 29, 2017.

(51) Int. Cl.
*G06F 21/00* (2013.01)
*G06N 5/02* (2006.01)
(Continued)

(52) U.S. Cl.
CPC ............... *G06N 5/02* (2013.01); *G06F 16/23* (2019.01); *G06F 21/606* (2013.01);
(Continued)

(58) Field of Classification Search
CPC ....... H04W 36/14; H04W 48/18; H04W 8/20; H04W 36/0033; H04W 36/0072;
(Continued)

(56) References Cited

U.S. PATENT DOCUMENTS 7,305,345 B2  12/2007  Bares et al.
7,392,162 B1   6/2008  Srinivasan et al.
(Continued)

FOREIGN PATENT DOCUMENTS

| CN | 105631707 | 6/2016 |
| WO | 2006132759 | 12/2006 |
| WO | 2017147785 | 9/2017 |

OTHER PUBLICATIONS

AI for Recruiting: A Definitive Guide for HR Professionals, Available on internet at: https://ideal.com/ai-recruiting/, Jan. 31, 2018, 11 pages.

(Continued)

*Primary Examiner* — Mahfuzur Rahman
(74) *Attorney, Agent, or Firm* — Kilpatrick Townsend & Stockton LLP

(57) ABSTRACT

Embodiments relate to de-obfuscated data to process at one or more artificial-intelligence (AI) decision nodes throughout a communication decision tree. Through processing directed by the communication decision tree, additional de-obfuscated data is collected and securely transmitted in de-obfuscated or re-obfuscated form to enrich underlying data structures.

20 Claims, 11 Drawing Sheets

(51) Int. Cl.
*G06F 21/62* (2013.01)
*G06N 20/00* (2019.01)
*G06Q 30/06* (2012.01)
*G06F 16/23* (2019.01)
*G06F 21/60* (2013.01)

(52) U.S. Cl.
CPC ...... *G06F 21/6218* (2013.01); *G06F 21/6245* (2013.01); *G06N 5/022* (2013.01); *G06N 20/00* (2019.01); *G06Q 30/0631* (2013.01); *G06F 2221/2145* (2013.01)

(58) Field of Classification Search
CPC ..... H04W 88/06; H04W 76/22; H04W 76/11; H04W 76/27; H04W 76/10
See application file for complete search history.

(56) References Cited

U.S. PATENT DOCUMENTS

| | | | |
|---|---|---|---|
| 8,321,371 | B2 | 11/2012 | Bridges et al. |
| 9,665,641 | B1 | 5/2017 | Zhang |
| 9,674,154 | B1* | 6/2017 | Canavor ............ H04L 63/0407 |
| 9,785,715 | B1 | 10/2017 | Busey et al. |
| 10,089,983 | B1* | 10/2018 | Gella .................... G10L 15/183 |
| 10,423,628 | B2* | 9/2019 | Bolcer ................. G06F 16/9535 |
| 2006/0026203 | A1* | 2/2006 | Tan ........................ G06N 5/022 |
| 2009/0058859 | A1 | 3/2009 | Crawford et al. |
| 2011/0055098 | A1 | 3/2011 | Stewart |
| 2012/0150626 | A1 | 6/2012 | Zhang et al. |
| 2013/0346886 | A1 | 12/2013 | Cauchois et al. |
| 2014/0122355 | A1 | 5/2014 | Hardtke et al. |
| 2014/0358828 | A1 | 12/2014 | Phillipps et al. |
| 2014/0365358 | A1* | 12/2014 | Higaki ................. G06Q 20/027 705/39 |
| 2015/0006294 | A1 | 1/2015 | Irmak et al. |
| 2015/0161566 | A1 | 6/2015 | Cai |
| 2016/0004705 | A1* | 1/2016 | Petrocik ............ G06F 16/24578 707/727 |
| 2016/0132800 | A1* | 5/2016 | Davar ................. G06Q 10/0637 705/7.36 |
| 2016/0328715 | A1* | 11/2016 | Gideoni .................. H04L 67/22 |
| 2016/0350406 | A1 | 12/2016 | Byron et al. |
| 2016/0358240 | A1 | 12/2016 | Redfern et al. |
| 2017/0006342 | A1* | 1/2017 | Nagaraja Rao .... G06Q 30/0241 |
| 2017/0061382 | A1 | 3/2017 | Zhang et al. |
| 2017/0061472 | A1 | 3/2017 | Mathis |
| 2017/0193451 | A1 | 7/2017 | Fang |
| 2017/0193452 | A1 | 7/2017 | Wang et al. |
| 2017/0344556 | A1 | 11/2017 | Wu et al. |
| 2018/0060749 | A1 | 3/2018 | Yan et al. |
| 2018/0084078 | A1 | 3/2018 | Yan |
| 2018/0225714 | A1* | 8/2018 | Lewis ................... H04W 4/021 |
| 2018/0232592 | A1* | 8/2018 | Stewart ............ G08B 13/19606 |
| 2018/0308124 | A1 | 10/2018 | Gao et al. |
| 2019/0050427 | A1* | 2/2019 | Wiesel ...................... G06T 7/11 |

OTHER PUBLICATIONS

Faliagka et al., Application of Machine Learning Algorithms to an online Recruitment System, ICIW 2012: The Seventh International Conference on Internet and Web Applications and Services, Available on internet at: http://citeseerx.ist.psu.edu/viewdoc/download?doi=10.1.1.885.909&rep=rep1&type=pdf, Jan. 2012, pp. 215-220.
O'Neill, How Vector Space Matching Technology is One-Upping the ATS Ability to Unearth Your Top Applicants, Available on internet at: https://www.mightyrecruiter.com/blog/author/heather/, Feb. 15, 2017, 3 pages.
Zimmermann et al., Data-driven HR Resume Analysis Based on Natural Language Processing and Machine Learning, Available on internet at: https://arxiv.org/pdf/1606.05611.pdf, Jun. 21, 2016, 6 pages.
Zendesk, "Guide: Zendesk's New Solution That Uses Machine Learning to Resolve Customer Queries", https://techseen.com/2017/05/04/zendesk-guide-machine-learning/, May 4, 2017, 5 pages.
Zendesk, "What Zendesk is Made of", zendesk, retrieved from https://www.zendesk.co.uk/product/tech-specs/, Feb. 1, 2018, 14 pages.
Zendesk, "Virtual Customer Assistant-Answer Bot", retrieved from https://www.zendesk.com/answer-bot/, Jan. 30, 2018, 7 pages.
Eve, Zendesk Support, "Best practices: Answer Bot customer service for agents", retrieved from https //support.zendesk.com/hc/en-us/articles/115011229087-Best-practices-Answer-Bot-customer-service-for-agents, Feb. 1, 2018, 3 pages.
Huang, et al., "Extracting Chatbot Knowledge from Onlin Discussion Forums", retrieved from https://www.aaai.org/Papers/IJCAI/2007/IJCA107-066.pdf, Jan. 6, 2007, 6 pages.
Mortimer, "Introducing Answer Bot—Automatic Article Suggestions for Better Self-Service Support", retrieved from https //support .zendesk.com/hc/en-us/articles/115010891827-Introducing-Answer-Bot-Automatic-article-suggestions-for-better-self-service-support, Aug. 2017.
Pleasant, "Zendesk Adds Answer Bot to Zendesk Guide", Unified Communications Strategies, Aug. 22, 2017, 2 pages.
Spanier, "Working with Answer Bot (for Agents)", retrieved from https://support.zendesk.com/hc/en-us/articles/115010243928, Jul. 2017, 6 pages.
International Application No. PCT/US2018/051421, International Search Report and Written Opinion dated Jan. 7, 2019, 13 pages.
International Application No. PCT/US2018/051422, International Search Report and Written Opinion dated Jan. 4, 2019, 10 pages.
International Application No. PCT/US2018/051421, International Preliminary Report on Patentability dated Apr. 9, 2020, 9 pages.
International Application No. PCT/US2018/051422, International Preliminary Report on Patentability dated Apr. 9, 2020, 6 pages.

* cited by examiner

MACHINE-LEARNING-BASED PROCESSING OF DE-OBFUSCATED DATA FOR DATA ENRICHMENT

CROSS-REFERENCE TO RELATED APPLICATIONS

This application claims the benefit of and the priority to U.S. Provisional Application No. 62/566,026, filed on Sep. 29, 2017, which is hereby incorporated by reference in its entirety for all purposes.

FIELD

Embodiments relate to de-obfuscated data to process at one or more artificial-intelligence (AI) decision nodes throughout a communication decision tree. Through processing directed by the communication decision tree, additional de-obfuscated data is collected and securely transmitted in de-obfuscated or re-obfuscated form to enrich underlying data structures.

BACKGROUND

Data from various inter-device communications is frequently processed to extract pertinent information to build profiles to inform subsequent communication approaches. The communications may include personally identifiable information (PII) that can be associated with a particular entity. However, collected PII is frequently incomplete and/or predictive power of the data can be limited due to a high dimensionality and/or relatively small size of the data. Thus, some systems maintain a large data set of non-personally identifiable information (NPII) to facilitate identifying attribute co-occurrences and/or identifying predictive attribute factors for various events.

Managing the NPII data is associated with complications. For example, in order to build robust profiles pertaining to a given user, it can be useful to identify a set of communications associated with a same identifier (e.g., MAC address, other device identifier, user social security number, user name, etc.) and to aggregate information across the communications. Thus, it can be disadvantageous to preliminarily scrape identifiers from communications. However, availing a full profile to another system can—in at least some circumstances—violate privacy rules and/or security standards. Thus, challenges remain as to how to efficiently build profiles and to capitalize on available data to construct particular communication strategies.

SUMMARY

In some embodiments, a computer-implemented method is provided. A request to perform a machine-learning communication workflow is received from a client system. A set of obfuscated identifiers are received in association with the request for which processing via the machine-learning communication workflow is requested. Each obfuscated identifiers of the set of obfuscated identifiers corresponds to an identification of an obfuscated version of a profile stored at a data management system. The obfuscated version lacks personally identifiable information (PII). For each obfuscated identifier in the set of obfuscated identifiers, the obfuscated identifier is mapped to a non-obfuscated identifier that identifies a non-obfuscated version of the profile that includes PII. For each obfuscated identifier in the set of obfuscated identifiers, user data is retrieved from the non-obfuscated version and learned data generated by training a machine-learning model using other user data is also retrieved. For each obfuscated identifier in the set of obfuscated identifiers, the machine-learning model configured with the learned data is executed to process at least part of the user data and one or more communication specifications are identified based on the execution of the machine-learning model configured with the learned data. For each obfuscated identifier in the set of obfuscated identifiers, content is caused to be transmitted to a destination address identified in the user data in accordance with the one or more communication specifications and non-obfuscated communication-activity data is generated for the non-obfuscated profile identifier based on any communications detected in response to the content transmission. The non-obfuscated communication-activity data is obfuscated to generate a set of obfuscated data for the set of obfuscated identifiers. At least part of the set of obfuscated data is transmitted to the client system. For each of at least some of the set of obfuscated identifiers, storage of at least some of the non-obfuscated communication-activity data in association with the non-obfuscated profile identifier to the data management system is caused.

In some embodiments, a computer-program product is provided that is tangibly embodied in a non-transitory machine-readable storage medium. The computer-program product can include instructions configured to cause one or more data processors to perform operations of part or all of one or more methods disclosed herein.

In some embodiments, a system is provided that includes one or more data processors and a non-transitory computer readable storage medium containing instructions which, when executed on the one or more data processors, cause the one or more data processors to perform operations of part or all of one or more methods disclosed herein.

BRIEF DESCRIPTION OF THE DRAWINGS

Illustrative embodiments of the present invention are described in detail below with reference to the following drawing figures.

DESCRIPTION

Figure 1:
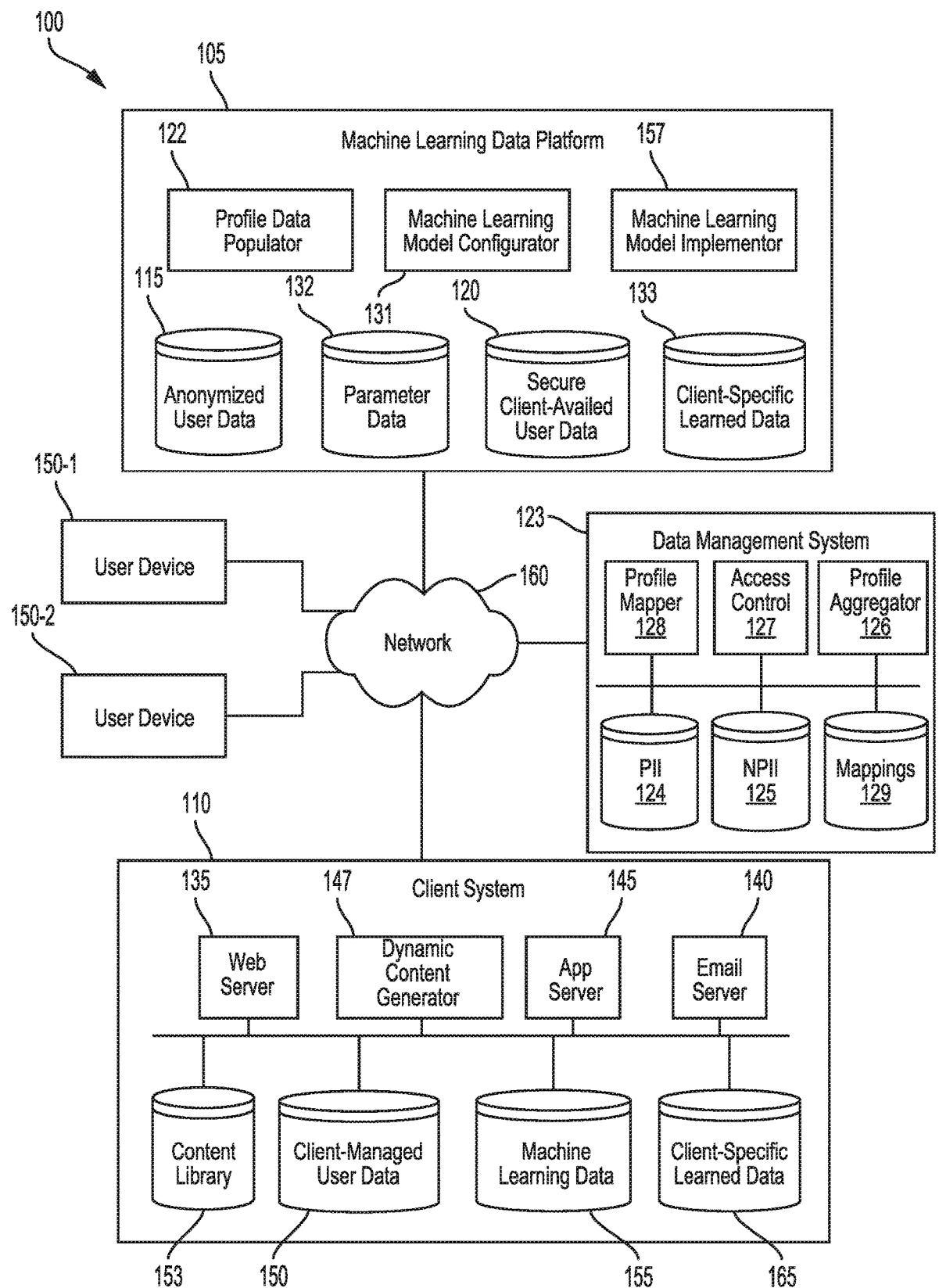
FIG. 1 shows a block diagram of an interaction system.

In some embodiments, systems and methods are provided that use machine-learning techniques to select specifications for communicating with devices. The devices can correspond to a set of obfuscated profiles identified by a client. However, a machine learning data platform may access de-obfuscated data to facilitate model execution and communication.

For example, a client system can send a set of obfuscated identifiers that correspond to obfuscated versions of a set of profiles to the machine learning data platform with a request to perform a machine-learning communication workflow to engage users. The obfuscated versions of the set of profiles can lack personally identifiable information and may have been identified by the client system via a response to a client-initiated query. The client system may have generated the query to includes a set of characteristics associated with a user, device and/or online activity. The query can be processed at a data management system that maintains a large population of profiles. The data management system can identify a set of profiles that have each of the set of characteristics. However, availing full access to the set of profiles (which may include PII, such as a user's name, email address, social security number, etc.) may violate privacy laws and/or security norms.

Thus, the data management system may generate an obfuscated data set to correspond to the set of profiles. The obfuscated data set may be generated by (for example) removing values for one or more fields from individual profiles, introducing noise to profiles, aggregating field values across profiles to generate population-level data for at least some fields, scrambling field values across profiles, etc. It will be appreciated that the extent and/or type of obfuscating may be specifically identified and implemented for the precise data set and/or client. Thus, even if a profile is represented in multiple obfuscated data sets, it may be obfuscated differently across the data sets.

The obfuscated identifiers may further differ from absolute identifiers used by the data management system for profile indexing. Thus, the data management system may maintain a data structure that indicates (for example), for a given profile, one or more obfuscated identifiers that are associated with the profile. The data structure may further indicate—for each of the one or more obfuscated identifiers—a client, query and/or obfuscated data associated with the obfuscated identifier and/or how the profile has been or is to be obfuscated to generate the obfuscated version of the profile. In some instances, the obfuscated identifiers are unique across clients and/or across data sets, such that a given identifier is indicative of a specific type of obfuscating performed for a specific profile (e.g., and/or in correspondence with a specific data set) and/or a same profile is represented by different obfuscated identifiers availed to different clients.

The machine learning data platform can use profile data corresponding to the obfuscated identifiers to perform a machine-learning-based processing. In some instances, the client system sends the obfuscated data set to the machine learning data platform for processing. The obfuscated data set may include multiple data subsets, each corresponding to an obfuscated version of a profile. In some instances, the client system transmits the set of obfuscated identifiers, and the machine learning data platform requests, from the data management system, obfuscated profile data that corresponds to the set of obfuscated identifiers. In some instances, the client system transmits the set of obfuscated identifiers, and the machine learning data platform requests, from the data management system, de-obfuscated profile data that corresponds to the set of obfuscated identifiers. Thus, in some instances, more data field values are availed by the data management system to the machine learning data platform as compared to those availed to the client system.

For each of the identified (obfuscated or de-obfuscated) identified profiles, the machine learning data platform can execute a machine-learning-based workflow using available profile data. More specifically, a communication decision tree can include a set of nodes, each of which can represent an action to be initiated by the machine learning data platform and/or an event detection. Each action node can include a condition that, when satisfied indicates that a particular action corresponding to the node is to be performed. An action node can include (for example) a communication node indicating that a communication is to be availed at a user device in accordance with one or more communication specifications associated with the node. An action node can include a branching and/or decision node that determines a next direction for the trajectory, identifies one or more parameters or specifications for an upcoming action, and/or selects between multiple next nodes to be implemented. The branching and/or decision node can process at least part of (obfuscated or de-obfuscated) profile data using a trained machine-learning model (e.g., to identify a trajectory direction, action specification(s) and/or next node).

The machine-learning model can be trained to prioritize one or more variables, such as a probability that the trajectory will reach one or more particular nodes, a probability that a particular user-initiated action (e.g., opening a communication, activating a link within a communication, completing a purchase on a website associated with a client, etc.), a probability that new profile data will be collected, a weighted probability pertaining to new profile data collection (e.g., such that both probabilities of data collection and a magnitude of data collection are considered), etc. Communication decision trees can include multiple branching nodes, each of which can have a differently configured machine-learning model. The different configurations can be a result of different connections (e.g., as each branching node may be connected to different types of action nodes), differ profile data used to train the model and/or different prioritizations for the training. An interface can be provided that accepts input, for each branching node, that indicates what variable is to be prioritized.

The machine learning data platform can monitor for any incoming communications pertaining to the profile. Profile data can be updated based on (for example) detecting an action, detecting a new communication, detecting particular field values, detecting new information, or detecting a lack of a new communication or action.

In some instances, the machine learning data platform can assign each profile to a stage of the workflow based on detected events (or lack thereof). For example, each profile can initially be assigned to a first stage, at which the machine learning data platform triggers a transmission of a communication (e.g., having a communication specification identified via implementation of a machine-learning model) to a user device. If it is detected that the communication was opened (via detecting a request for message content), the profile can be assigned to a second stage, at which the message content—which can include a link—can be transmitted to the user device. If it is detected that the link was activated, the profile can be assigned to a third stage, at which webpage data from a web site is transmitted. If it is detected that a purchase is made at the web site, the profile can be assigned to a fourth "conversion" stage. The machine learning data platform can then aggregate data pertaining to profiles in a particular stage.

The machine learning data platform can create one or more data structures that map individual (obfuscated and/or de-obfuscated) profiles to corresponding updated data (e.g., detection of one or more new communications, actions, and/or information and/or a stage to which the profile progressed). The machine learning data platform can transmit the obfuscated identifiers and associated updated data to the client system and/or the de-obfuscated identifiers and the updated data to the data management system.

In some instances, the updated data is tagged with an indication that it was collected via implementation of the machine-learning-based workflow and/or communication decision tree. The tagging can be performed by the machine learning data platform prior to transmitting the updated data, at the data management system upon receiving the updated data and/or at the client system upon receiving the updated data. The client system and/or the data management system can then determine, for individual profiles, what data has been included in the updated data that is not in a current version of the corresponding (obfuscated or full) profile. The use of the tags can facilitate performing the assessment in a dynamic environment, in which the corresponding profiles themselves may be changing in view of new events that are unrelated to the machine-learning-based workflow and/or the communication tree. For example, potentially, a highly active user device is frequently transmitting communications that represent interactions with an app or web site. Each of these communications can indicate a current location of the user device. Thus, even if implementation of a machine-learning-based workflow identifies a recent location of the user device, it may not be informative.

Determining whether (and/or which) new data is informative can include determining whether inclusion of some or all of the updated data in a profile increases an entropy-based information value pertaining to a particular field value, a set of field values, whether a particular event (e.g., conversion) will be observed in association with the profile, and/or a type of particular event (e.g., conversion quantity) that will be observed in association with the profile. Determining whether is informative can include determining whether any, some or all of the updated data is redundant with information already represented in the profile (e.g., in its current version). Determining whether any, some or all of the updated data is informative can include determining whether any, some or all of the updated data has reduced a number of fields lacking a field value.

The client system and/or the data management system can then transmit a communication to the machine learning data platform that indicates, for each processed profile, a degree to which any updated data resulted in collecting new profile information. The machine learning platform can then perform a new or continued training process for a configuration for each machine-learning model corresponding to the machine-learning-based workflow. The configuration can be one that prioritizes information gathering (e.g., as opposed to occurrence of a conversion, communication opening or link activation).

FIG. 1 shows a block diagram of an interaction system 100. A machine learning data platform 105 can include one or more cloud servers and can be configured to receive user data from one or more client systems 105. The user data can include anonymized or partially anonymized user data (stored in an anonymized user data store 115) and/or secure client-availed user data (stored in a secure client-availed user data store 120), which may be less anonymized than anonymized user data or not anonymized. When secure client-availed user data is received, it may be securely stored in association with an identifier of a client, such that other clients cannot gain access to the data. The data may be stored in a multi-tenant cloud storage system such that multiple clients can log in to a central location to access a server or collection of servers, but where the specific access to data is controlled depending on which client has authenticated to the cloud storage system. Anonymized or partially anonymized user data may, or may not, be particularly configured for various clients (e.g., depending on which data the client supplied and/or data-sharing agreements associated with the client). Thus, a profile data populator 122 at machine learning data platform 105 can store profile data corresponding to one or more individual users for particular clients and can customize which field values are included in the profile data for individual clients.

In some instances, client system 110 sends a request for profile data to a data management system 123, which can be configured store and update one or more profiles. The profiles can be built from data received from one or more client systems that identify a set of corresponding data fields (e.g., as detected from content requests, interaction indications and/or cookies). Data management system 123 can index the profiles using a unique identifier. Data management system 123 can determine whether to merge profile data and/or whether to add new profile data to an existing profile (instead of generating a new profile) based on (for example) an extent to which one, more or all field values in the new profile data match corresponding field values in an existing profile and/or a degree to which a field (or combination of fields) for which there are matching values are unique across profiles. Each profile can include one or more field values that correspond to PII data 124 and/or one or more field values that correspond to NPII data 125. It will be appreciated that, in some instances, whether a field value is characterized as PII data or NPII data depends on which other field values are included in a profile-specific record.

Further details of determining whether profile data corresponds to an existing profile are described in U.S. application Ser. No. 14/831,565, filed on Aug. 20, 2015, which is incorporated by reference in its entirety. In some instances, the data management system is linked to a social relationship management (SRM) system, which analyzes metadata from various sources into a managed data store. The machine learning platform system may seamlessly plug into or disconnect from the SRM system to periodically transmit user-parameter data indicating which conversion events were (or were not) detected for a given represented user. Further details of such integration are included in U.S. application Ser. No. 15/385,261, filed on Dec. 20, 2016, which is hereby incorporated by reference in its entirety.

Data management system 123 can further be configured to process requests for access to data from one or more profiles. In some instances, a request can include (for example) one or more profile constraints and correspond to a request to return profile data pertaining to the profiles that match the constraints. In some instances, a request includes one or more identifiers and correspond to a request to return profile data for corresponding profiles.

A profile aggregator 126 at data management system 123 may identify one or more profiles that correspond to the constraints and/or identifiers. An access control 127 component can determine whether the profile(s) include PII. If so, access control 127 may transform the filters to obscure or remove the PII (e.g., by removing select field values, returning population-level values or value distributions for one or more fields, introducing noise to select field values, scrambling field values, etc.). Profile aggregator 126 can define a profile data set to include the non-PII profile data and/or transformed profile data. The profile data set can include individual records that correspond to a set of field values of an individual profile.

Rather than transmitting the identifier used by data management system 123 to identify the profile, a profile mapper 128 can assign a client-specific obfuscated identifier to each record. The client-specific obfuscated identifier may (or may not) be the same if a same profile is represented in multiple request responses. A mappings data store 129 can then associate each client-specific obfuscated identifier with (for example) an absolute identifier used for indexing at data management system 123, an identifier of client system 110, an identifier of a client set and/or an indication of a degree and/or type of obfuscation.

Subsequently, data management system 123 may receive a request for profile data, the request including one or more client-specific obfuscated client-specific identifiers. Access control 127 may determine whether a requesting device corresponds to the client associated with the identifier and whether any authenticating and/or permission information is valid. Profile mapper 128 may then identify the unobfuscated profile associated with the obfuscated identifier and determine whether and/or how profile data from the profile is to be filtered and/or transformed (e.g., by introducing noise or contributing a field value for a cross-profile aggregation) in accordance with an obfuscation protocol associated with the client-specific obfuscated identifier. It will be appreciated that, in some instances, mapping an obfuscated identifier to a non-obfuscated identifier can include a 1:1 mapping (e.g., when a client owns, has access to or initially provided the data within the obfuscated version of a profile and also the data within the non-obfuscated version of a profile). In some instances, the mapping includes a 1: many mapping between the obfuscated profile and multiple PII-containing profiles. A quantity of the "many" can be selected based on applicable privacy laws, specificity within the profiles, a number of profiles being accessed, etc.

In some instances, profile data populator 122 enhances a profile data set to supplement client-availed user data with partially anonymized user data, which can (as aggregated) define client-specific learned data (stored in a client-specific learned data store 133) for a given user. For example, data from a profile in the client-availed data can be mapped to one or more data sets in the anonymized or partially anonymized user data, such that richer data sets can be used in the machine-learning analyses. The mapping may occur using overlapping data (e.g., an IP address, if included in the anonymized or partially anonymized user data, a purchase time, a pseudo-random user identifier assigned by a client, etc.).

A machine learning model confugerer 131 can configure a given machine learning model based on (for example) an identified target outcome, available training data, one or more client-identified constraints and/or potential actions as indicated by a communication decision tree and/or by a client. Configuring the machine learning model can include defining one or more parameters for a particular instance of the model (e.g., the instance being associated with a particular branching node, client and/or time period).

Each parameter can be indicative of a relationships and/or correlation between user attributes (stored in a learned parameter data store 132). The parameter(s) can include a weight that indicates how and/or an extent to which a first user attribute is predictive of a second user attribute that corresponds to an indication as to whether and/or an extent to which a target outcome occurred. The weight may be defined along a discrete or continuous value range and/or can be binary.

As one example, the parameter(s) can indicate which attributes from amongst a set of attributes are predictive of future occurrence of a particular type of conversion event. For example, it may be determined that having visited a webpage associated with a "travel" tag more than twice in the last month was a predictor of buying a piece of luggage. As another example, it may be determined that having visited a movie-review webpage within a given day was a predictor for later purchasing an online rental of a movie. Indirect associations and trends may also be learned, such as identifying there is an inverse correlation between an age of the user and an average time spent online each day. Each parameter may be associated with a strength and/or confidence of a relationship, optionally with serial associations between the data points gathered and the conclusions being made, where each association in serial carries a certain probability that the data at the start of the association is accurate for what it says and a certain other probability that the association itself is accurate.

The configuring may, but need not, be performed using client-availed profile data and/or to produce client-specific parameters. The client-specific parameter(s) may be, for example, a modified version of the parameter(s) generated using the anonymized or partially anonymized profile data.

Various machine-learning techniques may be used to generate learned data. For example, a machine-learning technique may use decision-tree learning, association-rule learning, an artificial neural network, deep learning, inductive logic programming, a support vector machine, clustering, a Bayesian network, reinforcement learning, representation learning, similarity and metric learning, sparse dictionary learning, a genetic algorithm, or rule-based machine learning. In some instances, a machine-learning technique includes an ensemble technique, which learns inter-ensemble weights to apply to results produced from various underlying techniques (such as two or more of those previously mentioned). The inter-ensemble weights may be identified based on (for example) accuracy, speed and/or resource usage associated with the underlying techniques.

Training a machine-learning technique (to identify one or more parameters) can include identifying how a set of observed inputs (e.g., content of a marketing email, content of a promotion, and/or the configuration of a web site) relates to a set of corresponding outputs (e.g., an outcome, such as the presence or absence of certain conversion event, for a corresponding marketing email, a corresponding promotion, and/or a corresponding web site configuration). These observed observations can be used to identify modeled relationships and/or trends, with a goal of predicting candidate factual information (e.g., a predicted next input to be received or a predicted output based on certain inputs) that has not yet occurred based on factual information leading up to the candidate factual information. Each prediction can carry a confidence or probability, and chains of predictions have a combined confidence or probability.

Thus, machine learning model configurator 131 can identify model parameters for particular client systems 110 based on (for example) target outcomes, client-specific profile data and/or machine-learning techniques. Client-specific learned data can be selectively shared with a client system having provided the underlying client-availed profile data. Client system 110 can include a system that hosts one or more web sites, hosts one or more apps and/or causes emails to be transmitted. For example, client system 110 can include a web server 135 that receives and responds to HTTP requests for pages on one or more domains and an email server 140 that delivers emails to users' email addresses. Client system 110 may further or alternatively include an app server 145 to receive and respond to requests received via an application executing on a user device. Thus, one or more servers at client system 110 can be configured to detect requests from one or more user devices 150-1, 150-2 and/or trigger transmission of content to one or more user devices 150-1, 150-2. User devices 150-1, 150-2 may include, for example, a computer, smart phone, tablet, etc. It will be appreciated that, in various circumstances, a single user device may be associated with a single user or more than one users. Further, a single user may be associated with a single user device or more than one user devices.

Web server 135 and/or app server 145 may store indications of requests for content (e.g., a webpage or app page) from a content library 153 as user data in a client-managed user data store 150. The stored data may include automatically detected information (e.g., a request time) along with information included in the request (e.g., a device identifier, IP address, requested webpage, user-entered input, etc.). Storing the data may include updating a profile to include the data. Web server 135, email server 140 and/or app server 145 may further store data in client-managed user data store 150 that indicates which content was distributed to particular user devices (e.g., by identifying a transmission time, user-device identifier, content-object identifier(s), and/or type of communication).

Client system 110 can transmit at least part of the user data from client-managed user data store 150 to machine learning data platform 105, which can store it in secure client-availed user data store 120. The transmission(s) may occur periodically, during a request for client-specific learned data, at regular time intervals, etc. In some instances, client system 110 at least partly anonymizes some or all of the user data (e.g., by omitting or obscuring values for at least some fields) before transmitting it to machine learning data platform (e.g., such that it is stored as anonymized or partially anonymized user data at the platform). In some instances, the data is not at least partly anonymized, such that the data is either stored in secure client-availed user data store 120 or is at least partially anonymized at machine learning data platform 105. For some datasets, the anonymized or partially anonymized data is received from a third party, after being stripped of PII, and stored by client system 110 without ever having access to the non-anonymized data. In some embodiments, the anonymized or partially anonymized data is natively anonymized or partially anonymized. In these embodiments, websites may run embed scripts on their web sites that, when executed, gather anonymized or partially anonymized data about accesses of the web sites by users. The scripts may gather only information that may be gleaned without knowing a user's personal information and stored in a data cloud that ensures that user identity can never be deduced beyond a certain probability.

Client system 110 can store machine-learning data in a machine learning data store 155. In some instances, the machine learning data includes an indication of one or more decisions made at a branching node for a given trajectory, one or more content specifications identified using a communication decision tree and/or one or more parameters. The machine-learning data can be requested from, received from and/or derived from data from machine learning platform 105. For example, in some instances, machine learning model configurator 131 causes parameters generated for and/or applicable to a client to be transmitted to client system 110. As another example, a machine learning model implementor 157 can apply machine learning model configured with particular parameters to particular profile data to identify one or more particular communications specifications to define a communications action to be taken for a client (and/or a next node of a trajectory) that corresponds to the profile data. Machine learning model implementor 157 can then cause an indication of the identified communications action and/or the next node to be transmitted in association with an identifier of a trajectory, user and/or user device.

Identifying a next node and/or communications specification(s) can include running a machine learning model (associated with a current branching node) using particular profile data and one or more learned hyperparameters. A result can indicate (for example) which of various content-presentation characteristics is associated with a high (e.g., above-threshold) or highest probability of leading to a particular target outcome (e.g., target conversion). In some instances, the analysis includes identifying one or more content-presentation characteristics associated with a highest probability of leading to a particular conversion target outcome. In some instances, the analysis balances the probabilities of leading to a particular conversion results with a predefined cost metric associated with various content-presentation characteristics.

In some instances, running the machine learning model using the parameters (e.g., at machine learning data platform 105 or client system 110) can include (for example) performing a regression analysis using the profile data and parameters to generate a number that can be compared to one or more thresholds. The one or more thresholds can define two or more ranges (e.g., open-ended or closed ranges), with each range corresponding to a particular next node and/or communications action. In some instances, running the machine learning model using the parameters can include processing at least part of the profile data and at least part of the parameters to produce a result that can be compared to (e.g., via calculation of a difference, calculation of a cost using a cost function, etc.) each of a set of reference data variables (e.g., single values, a vector, a matrix, a time series, etc.)—each being associated with a particular next node and/or communications action and each potentially defined at least in part based on a parameter. A node or communication associated with a reference data variable for which the comparison indicated a closest correspondence can be selected.

A dynamic content generator 147 can trigger a presentation of a content object in accordance with the selected communication specification(s). To generate an appropriate instruction, dynamic content generator 147 may first identify what communication channel is to be used to transmit the object, the type of object that is to be transmitted, a version of content that is to be transmitted and/or when the content object is to be transmitted. The identification can be determined based on (for example) a result of an implementation of a machine learning model, a configuration of a machine learning model (e.g., which may restrain potential options with respect to one or more of these options), and/or one or more parameters.

Dynamic content generator 147 can identify a type of communication (e.g., email, SMS message, pop-up browser window or pushed app alert) to be transmitted, which can inform (for example) which of web server 135, email server 140 and/or app server 145 is to transmit the communication. The identification can be made explicitly (e.g., based on a machine-learning result, parameter, and/or machine-learning-model configuration) or implicitly (e.g., due to a selected content object being of a particular type).

Identifying the content object can include selecting from amongst a set of existing content objects or generating a new content object. The content object can include (for example) a webpage, an object within a webpage, an image, a text message, an email, an object within an email and/or text. In some instances, a result of executing a configured machine-learning model on profile data identifies a particular content object. In some instances, a result identifies a characteristic of content (e.g., having a particular metadata category) and/or identifies a particular technique for selecting content. For example, a result may indicate that a "tools" item is to be featured in a content object and/or that a communication is to include four content objects that correspond to four different (though unspecified) categories. In such instances, dynamic content generator 147 can (for example) select from amongst a set of potential content objects using a selection technique that is (for example) indicated via a result of the machine-learning implement, via a parameter, and/or via a predefined setting. For example, a selection technique may indicate that a selection technique is to include a pseudo-random selection technique, a technique to identify a most recently added object, a technique to identify a highest-conversion object within a set of potential content objects (e.g., having one or more attributes as indicated in a machine-learning result).

In some instances, a time at which a communication is to be transmitted is explicitly identified (e.g., based on a machine-learning result, parameter, and/or machine-learning-model configuration). For example, a time range can be defined as beginning with a current time and ending with a client-identified maximum time. The model may evaluate a set of regularly spaced potential transmission times within the time range. (In some instances, each potential transmission time is considered multiple times in combination with other potential specifications, such as content categories or communication channels.) A machine-learning model result can identify a transmission time associated with a highest probability of resulting in a target outcome. (Notably, if combinations of specifications are considered, the transmission time may include the time in a combination associated with the highest probability. In some instances, a communication is transmitted immediately, upon receiving a next request for content (e.g., corresponding to a given web site or app) from a user device associated with a machine-learning result, or in accordance with a predefined transmission schedule.

In some instances, each specification corresponding to a communication is identified (e.g., during a task and/or using a machine-learning model, a machine-learning configuration, a parameter, a client rule, etc.) at or before the communication is transmitted. Thus, all or some client-controlled configuration of the communication and/or its transmission can be performed prior to transmission of the communication. In some instances, at least one specification corresponding to a communication is identified (e.g., during a task and/or using a machine-learning model, a machine-learning configuration, a parameter, a client rule, etc.) after the communication is transmitted. Thus, at least some client-controlled configuration of the communication and/or its transmission can be performed after transmission of the communication. This post-transmission configuration can thus be based upon learned data and/or profile data that was not available prior to the transmission of the communication. For example, additional profile data corresponding to a user may become available between a first time at which an email was transmitted and a second time at which the email is opened and rendered. The transmitted email can include a script that executes when the email is to be rendered. The script can cause a request to be issued to identify device properties, such as a layout and/or application type. The script can pass these properties along with a request for content to be presented to a server. Thus, the server can select content and/or identify one or more display configurations based on specific rendering information, current profile data and/or current parameters to direct a selection of specific content.

As an additional or alternative example, the communication may contain one or more references or links to pages that, when opened (e.g., in a web browser), render content for display. The pages targeted by the links may include some content that was determined, by the machine learning engine, before or at the time the communication was generated. The pages can further be configured to include content that is to be selected or generated when a request for rendering the pages is detected (e.g., when a script detects activation of a link) and/or when the pages are being generated or rendered (e.g., as indicated by executing a script as part of loading the page). In some instances, a script in the email identifies the content configuration at the time of rendering or at the time that rendering is requested. In some instances, a script executing on the linked page identifies the content configuration.

As one example, a client system may offer online purchases of food delivery. It may be detected that a particular user had looked at a menu for a given restaurant at 2 pm. The client system may retrieve a set of user attributes from a profile data for the user from its client-managed user data. Client-specific learned data may indicate that there is a 76% chance that the user will make a purchase from the restaurant if an email including a discount code is sent in the evening to the user (e.g., as compared to a lower probability associated with other types of communication and other times). In response to determining that the 76% chance is above a 65% threshold for sending a discount threshold, email server 140 transmits an email to the user device. The email includes a script that, when executed, identifies the restaurant and discount to be presented. The user opens the email the next day at 10 am. The code is executed to request the restaurant and discount from the client system. The client system has since received updated public learned correlation data. The client system inputs the time, the user's location (as she is now at work) and prior purchase information to a decision tree built based on the learned data. It is determined that the discount is to be 10% (e.g., to maintain a threshold likelihood of conversion) and the restaurant is to be a deli near the user's work (e.g., to maximize a likelihood of conversion), whereas—had the user opened the email the night before, different user attributes and learned data would have resulted in a 15% discount (e.g., to maintain the threshold likelihood) from an Indian restaurant near the user's home (e.g., to maximize the likelihood). The email includes a link to order from the deli. When the user clicks on the link, the web server determines what content is to be presented—specifically, which food items are to be recommended. The recommendations are based on even more recently updated public learned correlation data, which indicate that salads and sandwiches should be recommended over soup and entrees, as the former options have been recently popular (predicted to be popular due to the warmer weather). Thus, this example illustrates how content presentations can be dynamically customized for a given user based on very recent learned data and user attributes.

Machine learning data platform 105 can generate updated client data based on (for example) any communications received from a user device (e.g., responsive to a workflow action). For example, the updated client data can include one or more new fields generated based on data in a header or payload of a received communication, an indication as to whether (e.g., and when) a particular event was detected, and/or a current or final stage of the workflow to which the profile is assigned. Machine learning data platform 105 can avail the updated client data (e.g., along with corresponding profile identifiers) to client system 110, which can store the updated data in client-specific learned data store 165. Client system 110 may, but need not, separately store the updated data from underlying profile(s).

It will be appreciated that, in some instances, some or all of machine learning data platform can be incorporated within client system 110. In some instances, client system 110 communicates with machine learning data platform during iterations of a communication decision tree. For example, client system 110 (e.g., web server 135 or app server 145 at client system 110) may detect a flag (e.g., included in a URL) in a request for web content or app content received from a user device, where the flag indicates its association with a machine-learning-based workflow). Client system 110 may then alert machine learning model implementor 157 of the request, so that a trajectory can be appropriately updated.

Machine learning data platform, client system 110 and user devices 150-1, 150-2 can communicate over a network 160, which can include, for example, the Internet, a local area network, a wide area network, and so on. It will be appreciated that various alternatives to the depicted and described embodiments are contemplated. For example, some or all of the machine learning may be performed at client system 110. Client system 110 may periodically receive anonymized or partially anonymized user data to process using a machine-learning technique.

One technique for obfuscating profile-related information corresponding to personally identifiable information, yet while delivering pertaining to the profile data is to generate groups of profiles such that (1) the users represented in the group have one or characteristics in common, and (2) the users represented in the group do not have mutually exclusive characteristics. Strictly as some examples, a client might be interested in presenting content to a group of users whom are interested in "auto". A retrieval mechanism (e.g., a data-store query) can be used to identify a set of profiles corresponding to an interest in "auto" can be a starting point. However, to satisfy the aforementioned aspect of including only profiles in the group that do not have mutually-exclusive characteristics, some profiles might be rejected out. Some examples of mutually-exclusive characteristics can include (e.g., depending on query constraints and/or data-set size): (a) gender, (b) income bracket, (c) marital status, etc.

When delivering groups of profiles that are similar, some profiles might be rejected out due to the presence of mutually exclusive attributes, and even when a group of profiles does not have any mutually exclusive characteristics, the group makeup can be made even more similar by selecting-in profiles that share still more characteristics in common (e.g., geographic region). Thus, a rule base can be used to reject some profiles from a group and/or to add select profiles. By selecting a greater number of rules, and/or by increasing the specificity of a given rule, and/or by requiring certain attributes that have a low incidence of occurrence to be present, it is possible to decrease the randomness of the grouping. By selecting a lesser quantity of rules, and/or by decreasing the specificity of rule, and/or by requiring certain attributes that have a high incidence of occurrence to be present, it is possible to increase the randomness of the grouping. Randomness can be tuned to a point on a randomness spectrum. Such tuning can be in response to a command (e.g., from a client system), and/or a specification, and/or in response to a set of privacy requirements.

In some instances, one client system can send PII profile data to a data management system (e.g., that manages profile content across clients or for a single client corresponding to the PII owner). The data management system can function as a NPII owner and/or user data aggregator. The client system or the data management system can generate a private obfuscated ID (e.g., hash tag, or other obfuscated user identifier). The private obfuscated ID can then be shared (e.g., by the client system with the data management or the converse). The data management system can associate (e.g., in a cookie) the private ID with collected NPII. Client-specific private-ID profile data can be aggregated with and associated-with NPII profile data generated based on communications to a data management system from other client systems. Thus, any direct association between a given ID and specific NPII attributes can be obfuscated. The grouped NPII can then be shared with the PII owner. The PII owner can then use the additional NPII provided for the group of profile identifiers to configure device-specific communications.

Other techniques for using and configuring communication decision trees are detailed in U.S. application Ser. No. 16/007,642, filed on Jun. 13, 2018 (entitled "Directed Trajectories through Communication Decision Tree using Iterative Artificial Intelligence"), and U.S. application Ser. No. 16/007,762, filed on Jun. 13, 2018 (entitled "Methods and Systems for Configuring Communication Decision Trees based on Connected Positionable Elements on Canvas"). Each of these applications is hereby incorporated by reference in its entirety for all purposes.

Figure 2A:
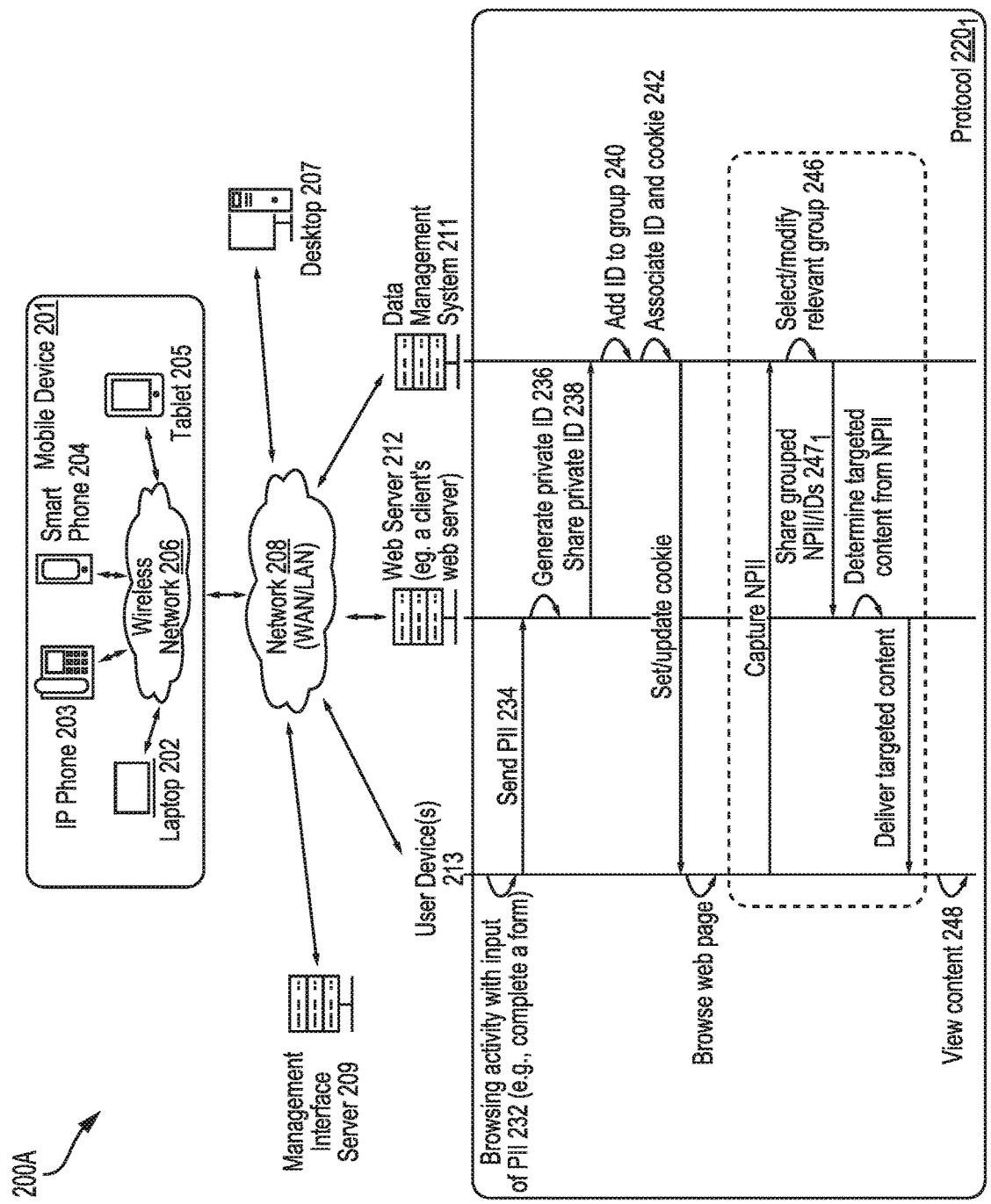
FIGS. 2A-2B illustrate inter-system communication environments to distribute obfuscated versions of user data.

FIG. 2A depicts an environment 200A in which anonymous information is associated to personally identifiable information without sharing personally identifiable information. Environment 200A comprises one or more instances of a web server 212 (associated with a particular client, i.e., a "partner"), one or more instances of a data management system 211, one or more instances of a management interface server 209, and a variety of types and instances of user devices 213 (e.g., a desktop 207, a laptop 202, an IP phone 203, a smart phone 204, a tablet 205 and/or other mobile devices 201). The aforementioned servers and devices can communicate through a wireless network 206 and/or a network 208 (e.g., a wide area network (WAN), a local area network (LAN), etc.). A protocol 201 depicts operations and communications by and among user devices, web server 212, and data management system 211.

In this example, web server 212 is associated with a particular client (e.g., a web site publisher, advertiser, user data consumer, etc.), who can be an owner of PII. Data management system 211 (e.g., user data aggregator, user data supplier, etc.) is associated with an owner and/or user of NPII. The aforementioned servers and devices in environment 200A can be configured to facilitate and/or monitor activities at user device 213, including browsing (e.g., see browsing activity operation 232), such as completion of an online form that requests personally identifiable information (e.g., an email address).

User device 213 can then send PII (see message 234) to web server 212. Web server 212 can in turn generate a private ID (e.g., hash tag) associated with any portions or combinations of the sent PII (e.g., see operation 236). Web server 212 (or other client system) can then share the private ID (see message 238) with data management system 211. In another example, the private ID can be shared when a user is receiving communications (e.g., email) via an addressable digital channel. In yet another example, the private ID can be shared with a data consumer (e.g., a partner) via any known communication technique (e.g., including offline techniques).

Data management system 211 can query a profile data store to determine whether field values from any existing profile match one or more NPII field values (e.g., a partial IP address) as shared by web server 212 (and/or, in some instances, any field values—NPII or PII field values). When such a match is identified, the private ID may be grouped with one or more other IDs that are associated with the existing profile (e.g., including an absolute ID used by data management system 211 and/or one or more other private IDs associated with different clients and/or processing instances). The private ID may be associated—at the data management system—with a particular client system and/or a particular processing instance. Data management system 211 can also associate the private ID with a user cookie (see operation 242) and set or update the cookie at user device 213. The association of the ID with NPII (e.g., cookie) can be made even when there is no transfer of PII in making the association.

Web server 212 (e.g., the PII owner) has its own PII and the generated private ID (e.g., hashed PII). Also, data management system 211 (e.g., the NPII owner) has (and/or can access) the private ID (e.g., hashed PII) and NPII (e.g., cookie). Subsequent communication between the PII owner and NPII owner can occur using the private ID.

For example, as shown by protocol 201, the user may continue to browse a web page at user device 213, allowing data management system 211 to capture additional NPII. Data management system 211 can use the new NPII to select and/or modify a relevant group of user NPII (e.g., see Operation 246) to then share e.g., see message 247$_1$) with web server 212. The NPII that is shared can be a cumulative NPII collection from a group of IDs that includes the private ID for the browsing user. The grouping can serve to prevent the web server 212 or a user of the web server 212 from determining whether the data it has received was the result of data directly collected from the browsing user or indirectly collected (e.g., as a result of the browsing user being a part of the group).

Figure 2B:
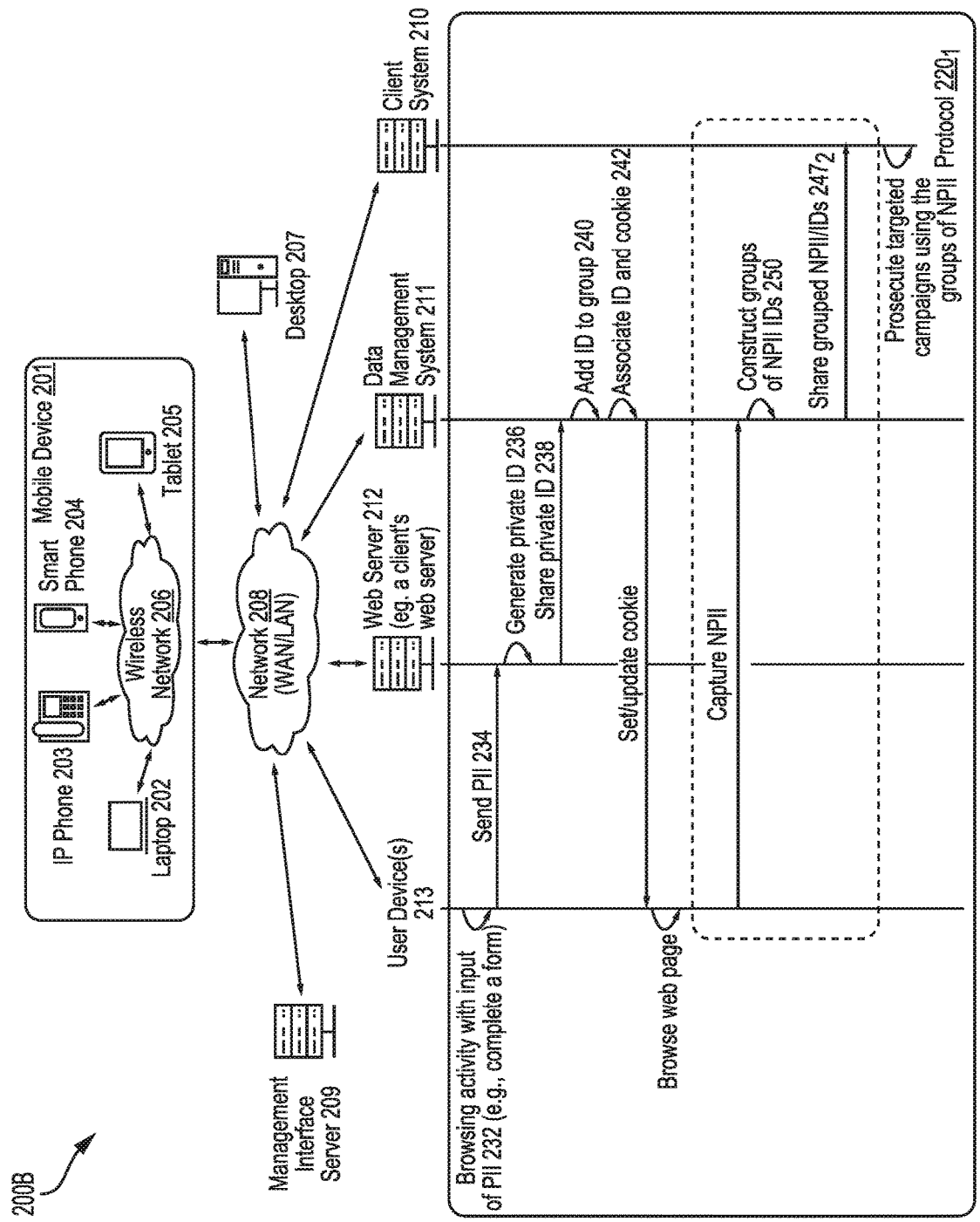

FIG. 2B depicts an environment 200B in which information is shared with a client system without sharing personally identifiable information. The discussion of FIG. 2A includes an example in which the private ID (e.g., an obfuscated ID) can be shared with client system, which can be used to avail additional user data to the client system.

As shown in environment 200B, a data management system 211 can use the new NPII to construct and/or modify a relevant group of user's NPII (e.g., see operation 250 in FIG. 2B and see operation 246 in FIG. 2A) to then share (e.g., see message 247$_2$) with client system 210. Thus, client system 210 can secure an enriched profile that includes PII and NPII collected locally and further includes NPII collected (for example) by one other more other client systems.

Figure 3:
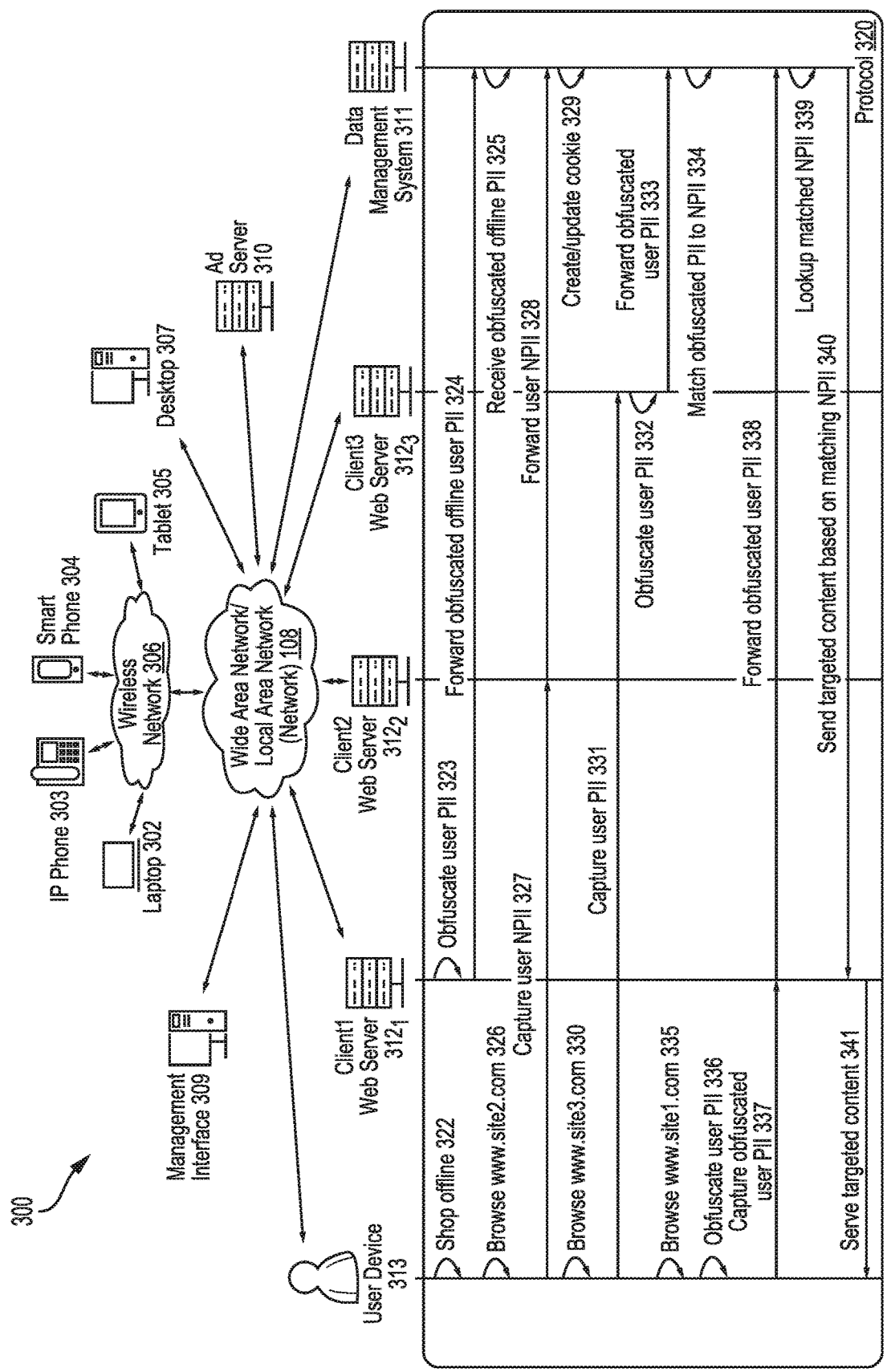
FIG. 3 illustrates an inter-system communication environment to distribute obfuscated versions of user data.

FIG. 3 presents an environment 300 for enhancing profile data. Environment 300 includes at least one instance of a data management system 311, a plurality of web servers 312 (e.g., corresponding to multiple clients devices of multiple clients: Client$_1$ web server 312$_1$, Client$_2$ web server 312$_2$, and Client$_3$ web server 312$_3$), at least one instance of an ad server 310, at least one instance of a management interface 309, and at least one instance of a user device 313. User device 313 can represent one of a variety of other devices (e.g., a desktop computer 307, a laptop computer 302, an IP phone 303, a smart phone 304, a tablet 305, etc.). The aforementioned servers and devices can communicate through a wireless network 306 and/or a network 308 (e.g., a wide area network (WAN), a local area network (LAN), etc.). The wireless network 306 and network 308 can be collectively referred to as the Internet.

A protocol 320 depicts operations and communications on and among user device 313, the plurality of web servers 312, and the data management system 311. In the example shown in protocol 320, a user 316 also operates user device 313 and performs other activities. Specifically, user 316 might shop offline (see operation 322) at the physical store of Client$_1$, and generate PII (e.g., an email address during rewards program registration) via one or more user-client interactions. Client$_1$ can obfuscate the captured user PII and forward the obfuscated representation of the user PII to data management system 311 (see operation 323 and message 324).

Data management system 311 can receive the obfuscated offline PII (see operation 325) and store it in a data store. The PII can be stored in an independent profile record and/or can be aggregated with corresponding information in a collective profile record, for which various clients may have authorization to access specific data (e.g., that corresponds to NPII fields and/or PII fields for which the client provided information).

User 316 may later anonymously browse a website "www.site2.com" hosted by Client$_2$ web server 312$_2$ (see operation 326). Client$_2$ web server 312$_2$ may then capture user NPII and forward the NPII to data management system 311 (see message 327 and message 328), such that data management system 311 can create or update a cookie for website "www.site2.com" on user device 313 (see operation 329).

User 316 may then login to and browse website "www.site3.com" (see operation 330) such that Client$_3$ web server 312$_3$ can capture user PII (see message 331) and generate an obfuscated representation of user PII, then forward it to data management system 311 (see operation 332 and message 333). In some cases, the data management system 311 can have access to sufficient information to discover one or more matches of the attributes associated with the obfuscated PII related to user 316 and the attributes associated with the NPII related to user 316 (see operation 334) based on various data (e.g., common attributes, etc.) and methods (e.g., deterministic matching, probabilistic matching, etc.). Data management system 311 can perform such matches without handling the PII from user 316.

Many possibilities for implementing a matching mechanism are possible. For example, a match can be deemed if obfuscated codes are identical. As an alternative or additional approach, deterministic matching and/or probabilistic matching can be used. A matching mechanism can be any form of logic implemented in software and/or hardware that is configured to receive a plurality of obfuscated codes or other anonymous information and to associate the obfuscated information when a match is determined to be present.

A match between two obfuscated codes can be a one-to-one match, or can be a one to many-match, or can be a many-to-one match.

User 316 can use user device 313 to login to and browse website "www.site1.com" hosted by Client₁ web server 312₁ and owned by Client₁ (see operation 335). Once logged in to "www.site1.com", user device 313 can obfuscate the PII of user 316. such that the obfuscated user PII can be captured by Client₁ web server 312₁ and forwarded to data management system 311 (see operation 336, message 337, and message 338). Data management system 311 can look up any NPII matched to the obfuscated PII forwarded from Client₁ web server 312₁ (see operation 339) and send targeted content based on the matching NPII back to Client₁ web server 312₁ (see message 340) to serve to user 316 browsing the website "www.site1.com" on user device 313 (see message 341). The herein disclosed techniques implemented in environment 300 and protocol 320 can thus enable Client₁, who initially may have only have had access to a limited PII information set pertaining to user 316, to access additional NPII captured from another source, all without sharing private PII with other parties within environment 300.

Various approaches for aggregating profile data are described in U.S. application Ser. No. 14/941,047, filed on Nov. 13, 2015, U.S. application Ser. No. 14/736,614, filed on Jun. 11, 2015, and in U.S. application Ser. No. 12/720,591, filed on Mar. 9, 2010. Each of these applications is hereby incorporated by reference in its entirety for all purposes.

Figure 4:
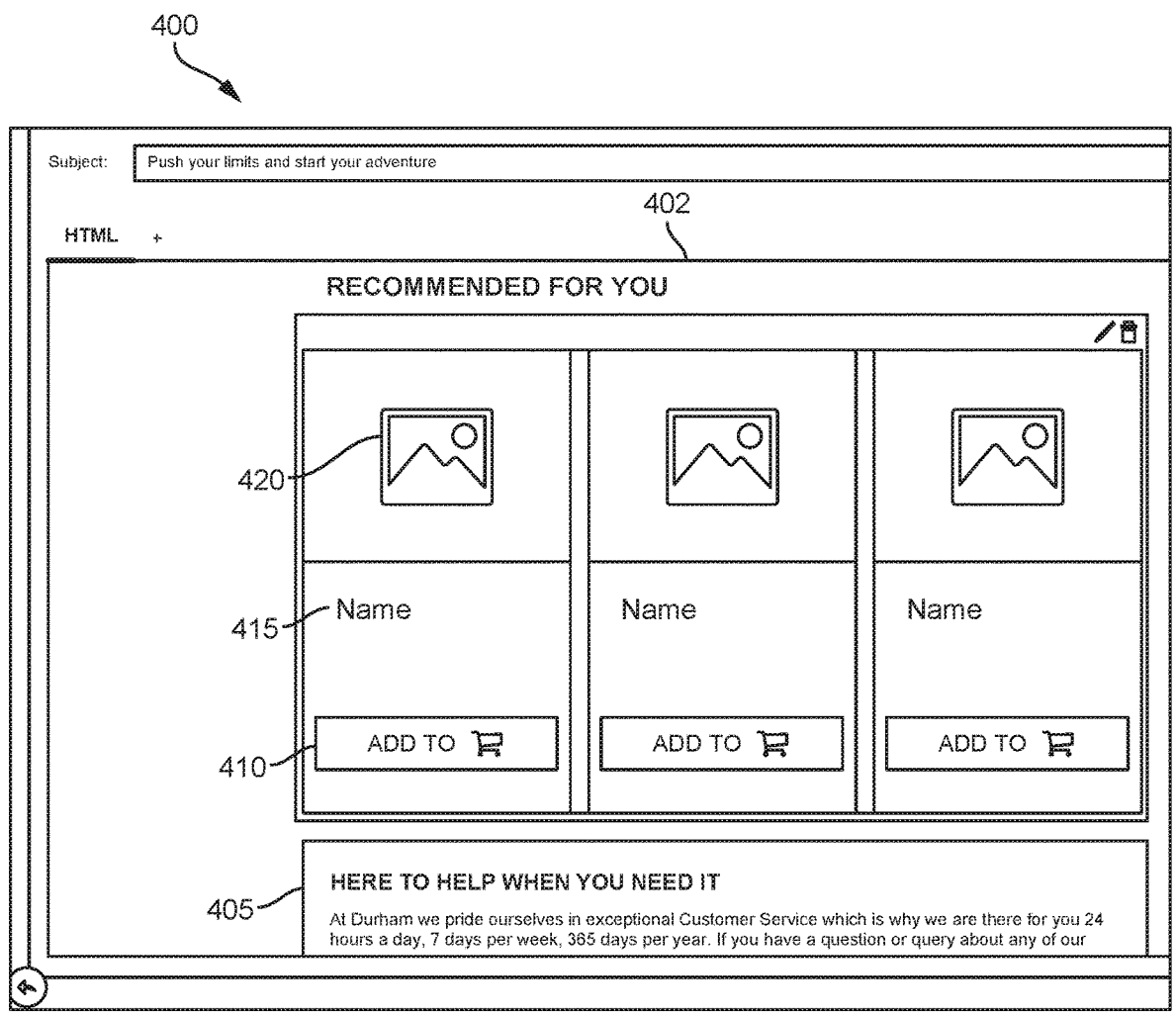
FIG. 4 shows a template to be used for generating an email communication.
Figure 5:
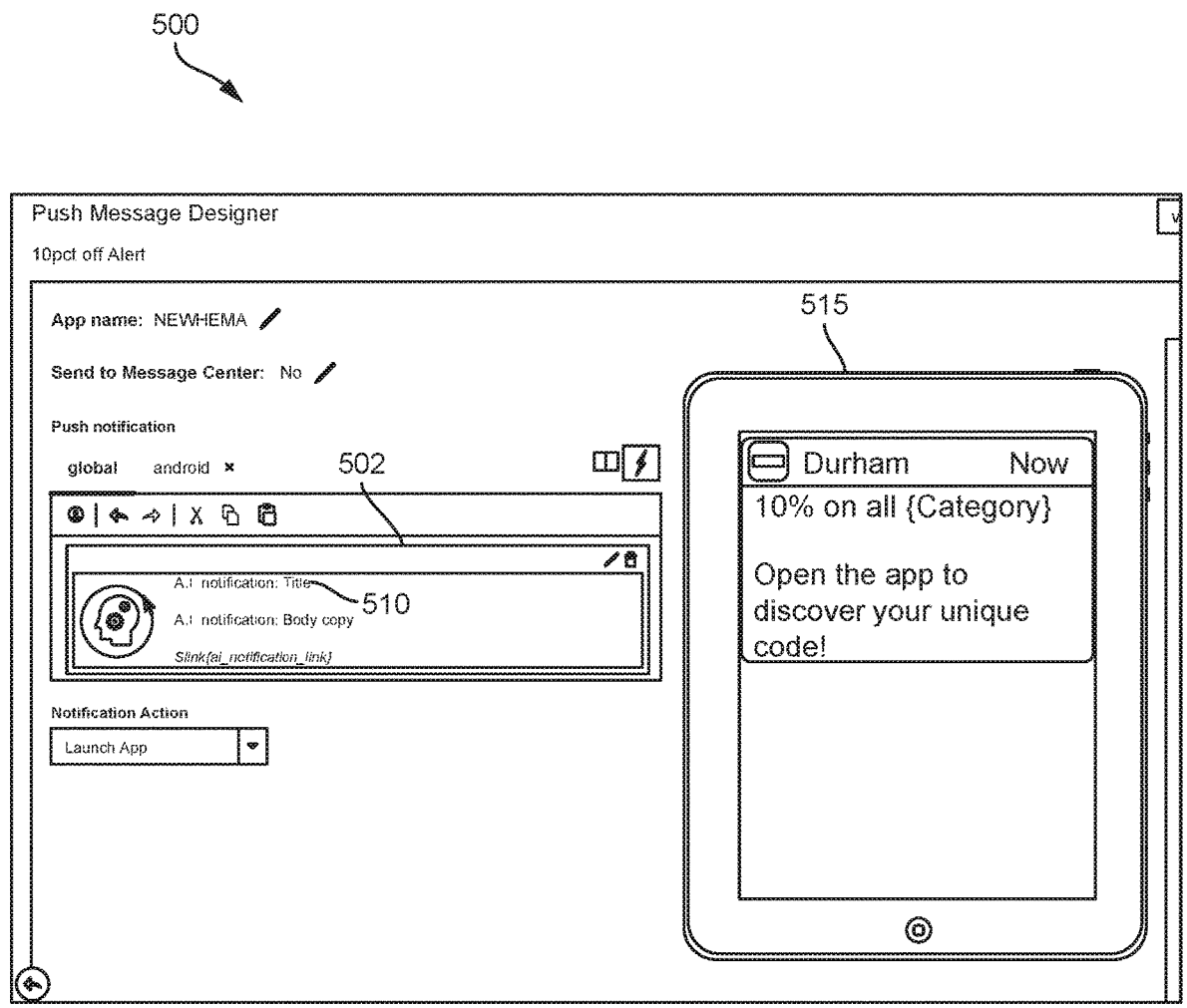
FIG. 5 shows a template to be used for generating an app notification communication.

FIGS. 4 and 5 illustrate interfaces 400 and 500 for configuring templates 402 and 502 for communications configured to be partly configured upon detecting a rendering process or at rendering. The configuring can include executing a configured machine-learning model using current learned configurations of the model and current profile data. Template 402 shown in FIG. 4 includes a template to be used for generating an email communication, and template 502 shown in FIG. 5 includes a template to be used for generating an app notification communication.

Template 402 includes static text (e.g., text 405) and interaction features (e.g., button 410). Template 402 further represents a particular layout, in which three items are to be linearly represented above text 405. Template 402 also include dynamic components (e.g., dynamic text 415 and dynamic image 420) that are configured to be identified when rendering of the email is requested or occurring. Thus, when an email communication is transmitted, the static components can be transmitted along with code configured to (upon detecting a request to render the email) locally identify at least part of current profile data, request at least part of current profile data, request identification of dynamic components, receive or retrieve dynamic components (e.g., identified using current profile data, current anonymized or partially anonymized data and/or current learned parameters) and/or generate a complete email based on the template and dynamic components. The generated email can then be presented.

Template 502 includes a static layout and multiple dynamic text components (e.g., a dynamic title section 510. Template 502 can be configured to be transmitted with a script that facilitates dynamically identifying each dynamic text component. For example, the script can—upon detecting a request to present the notification (e.g., in response to opening an app, clicking on a notification app element, etc.)—locally identify at least part of current profile data, request at least part of current profile data, request identification of dynamic text components, receive or retrieve dynamic text components (e.g., identified using current profile data, current anonymized or partially anonymized data and/or current learned parameters) and/or generate a complete notification based on the template and dynamic text components. The generated notification can then be presented. Interface 500 shows an example of a dynamically generated notification 515 this includes the static layout and particular dynamic text.

Figure 6:
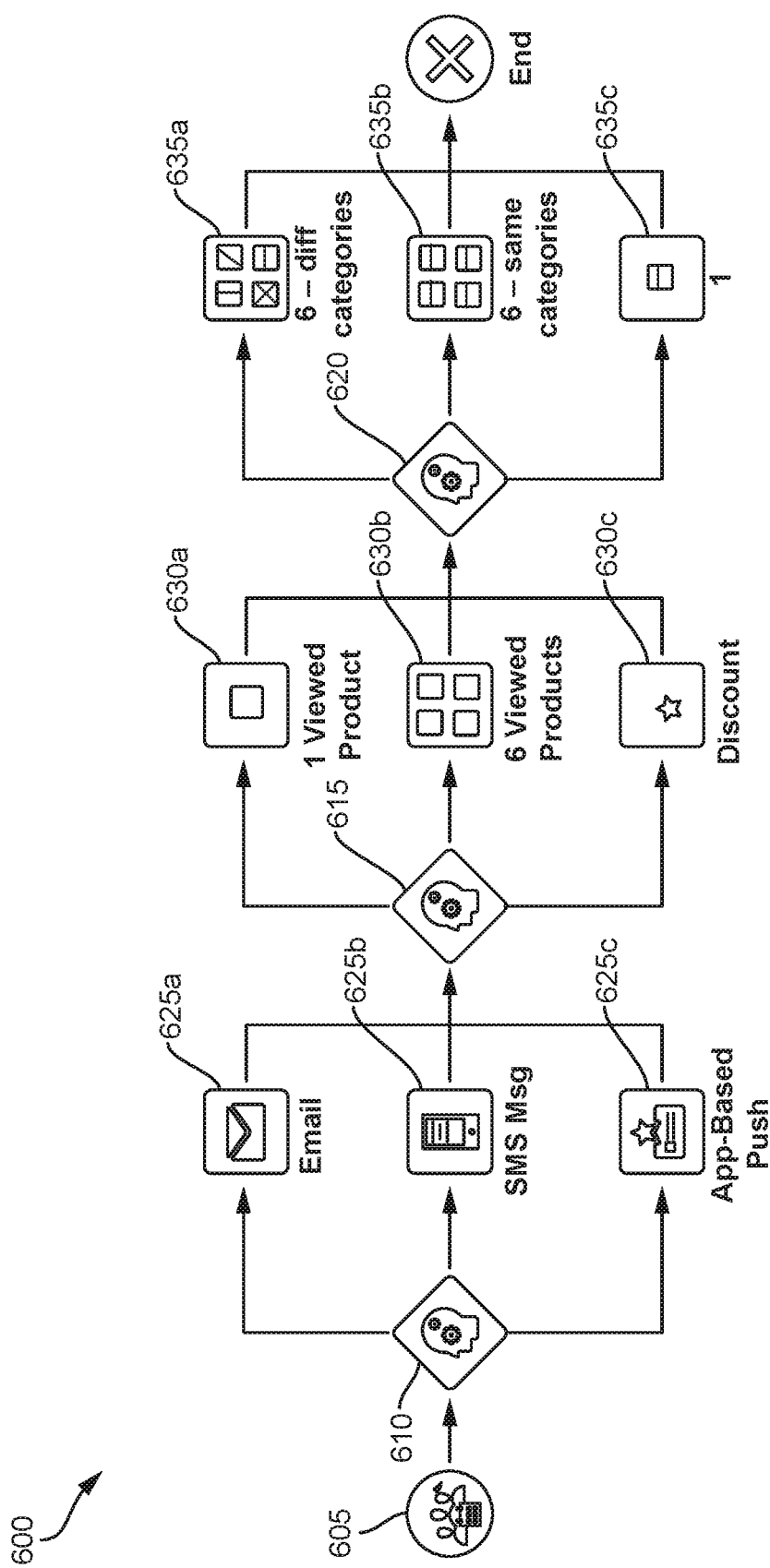
FIG. 6 shows a representation of a communication decision tree.

FIG. 6 shows a representation of a communication decision tree 600. Communication decision tree 600 includes a starting node 605, at which each trajectory begins. A particular trajectory can be (in this example) initialized upon detecting that a user has completed two particular actions (e.g., initialized two web-site sessions, purchased two items from a web site, navigated to at least two webpages on a web site, etc.).

Communication decision tree 600 includes three branching nodes 610, 615 and 620—each of which branches to connect to three nodes representing three different actions. A trajectory can automatically and immediately extend from initial node 605 to a first branching node 610, which triggers a first decision to be made. Specifically, the first decision can include identifying a communication channel to use to send an alert of a web-site feature. The alert can include an automatically presented static header that indicates (for example) that a product or discount (generally) is available in association with the web site. The alert may further be associated with dynamic content (e.g., that specifically identifies one or more products and/or a discount) that is to be identified at a second branching node 615 upon detecting a request to open the notification.

First branching node 610 is connected to a first action node 625a that represents an email communication channel, a second action node 625b that represents an SMS-message communication channel, and a third action node 625c that represents an app-based communication channel (where a notification would be pushed to and/or by an app installed at a user device).

The first decision can be made using a machine-learning model configured based upon one or more first parameters. The one or more first parameters can be dynamically determined based on anonymized and/or partially anonymized user data and/or client-specific data. For example, anonymized and/or partially anonymized user data may indicate—for each of various user sub-populations (as defined based on one or more user attributes)—how effective an alert transmission sent via each of the three types of communications channels was at triggering the user to initiate a session at a corresponding web site (e.g., as determined based on using tracking links within the alerts) and complete a transaction during the session. The anonymized and/or partially anonymized user data may correspond to many different web sites and/or web sites having one or more particular characteristics. The client-specific data can include data tracked by a given client for the particular web site of interest and can data that specifically identifies each user to which various alerts were transmitted and the result. The client-specific data may thus be richer in some respects relative to the anonymized and/or partially anonymized data, but the number of users represented in the client-specific data may be smaller than that represented in the anonymized and/or partially anonymized data. Further, the client-specific data may lack pertinent attribute combinations. For example, a given client may not have previously used app-based alerts, which may have reduced an accuracy with which a machine-learning model could predict potential effects of such alerts.

The machine-learning model (configured with the first parameters) can use profile data associated with the trajectory to determine which communication channel to user. The profile data can include client-collected profile data (e.g., using metadata, cookies and/or inputs associated with previous HTML requests from a user device associated with the trajectory). The profile data may further include other profile data requested and received from a remote user-profile data store, which may collect and manage profile data from multiple web hosts, clients, etc.

Upon identifying the communication channel, the trajectory extends to the corresponding action node (625a, 625b or 625c). An alert is then sent using the corresponding communication channel. The alert can be configured to automatically identify limited content and to cause the trajectory to extend to second branching node 610 upon detecting a request to open the alert. A decision can then be made at second branching node 610 to determine specific content to be presented in a body of the alert.

Thus, second branching node 615 is connected to a first notification content node 630a that represents content that identifies a product most recently viewed by the user at the web site, a second notification content node 630b that represents content that identifies four of the products most viewed (across users) at the web site over the last week, and a third notification content node 630c that represents content that includes an identification of a discounts. The second decision can be made using the machine-learning model configured based upon one or more second parameters. Thus, in some (but not all) instances, a general type of machine-learning model used at various branching nodes to make decisions can be the same, though particular configurations (e.g., indicating weights to be assigned to various user attributes, which user attributes are to be considered at all and/or target outcomes) can differ.

The one or more second parameters can be dynamically determined based on anonymized and/or partially anonymized user data and/or client-specific data. However, each of the anonymized and/or partially anonymized user data and/or the client-specific data may have changed since making the first decision, which can contribute to differences between the first and second parameters. Further, the potential actions considered at second branching node 615 differs from those considered at first branching node 610. Therefore, the first and second configurations can be different. Additionally, the profile data that is processed can differ between the first and second branching nodes. For example, a client-associated application may have been installed at a user device between processing performed at the first and second branching nodes (e.g., such that application-based notifications are an option at the second branching node but were not at the first).

Upon identifying the content, the trajectory extends to the corresponding content node (630a, 630b or 630c). The corresponding content is then transmitted to the user device, such that it can be presented at the user device.

The content can include one or more tracking links to a webpage at the web site. Upon detecting that a tracking link has been activated, the trajectory can extend to a third branching node 620. A decision can then be made at third branching node 615 to determine specific content to be presented at the requested webpage.

Thus, third branching node 620 is connected to a first webpage content node 635a that represents content that identifies four representative products—each associated with a different category; a second webpage content node 635b that represents content that identifies four representative products—each associated with a same category; and a third webpage content node 635c that represents content that identifies a single product predicted to be of interest to a given user based on previous webpage-interaction data.

The third decision can be made using the machine-learning model configured based upon one or more third parameters. The third parameter(s) can differ from the first parameter(s) and/or the second parameter(s) as a result of temporal changes to anonymized and/or partially anonymized user data, the client-specific data and/or as a result of differences of the potential actions. Additionally, the profile data processed at third branching node 620 can be different than that processed at first branching node 610 and/or second branching node 615 (e.g., as a result of detecting new metadata in communications from the user device and/or receiving new information corresponding to the profile from a remote system).

Upon identifying the content, the trajectory extends to the corresponding content node (635a, 635b or 635c). The corresponding content is then transmitted to the user device, such that it can be presented at the user device within a corresponding webpage.

It will be appreciated that, while communication decision tree 600 depicted in FIG. 6 shows a single decision being made at each communication stage (when a notification is to be transmitted, when a body of a notification is to be presented, and when a webpage is to be presented), multiple decisions may instead be made using a machine-learning model. For example, at branching node 610, a decision may be made as to what communication channel to use and when to transmit a notification (e.g., by identifying a time within a time period or a time from amongst a set of potential times). As another example, a separate decision may be made before or after the communications-channel decision to identify a transmission time. Thus, a machine-learning model may be configured to generate multiple outputs or multiple machine-learning models can have multiple configurations (each corresponding to different parameters and/or hyperparameters, each trained separately and/or each producing a separate type of output).

Figure 7:
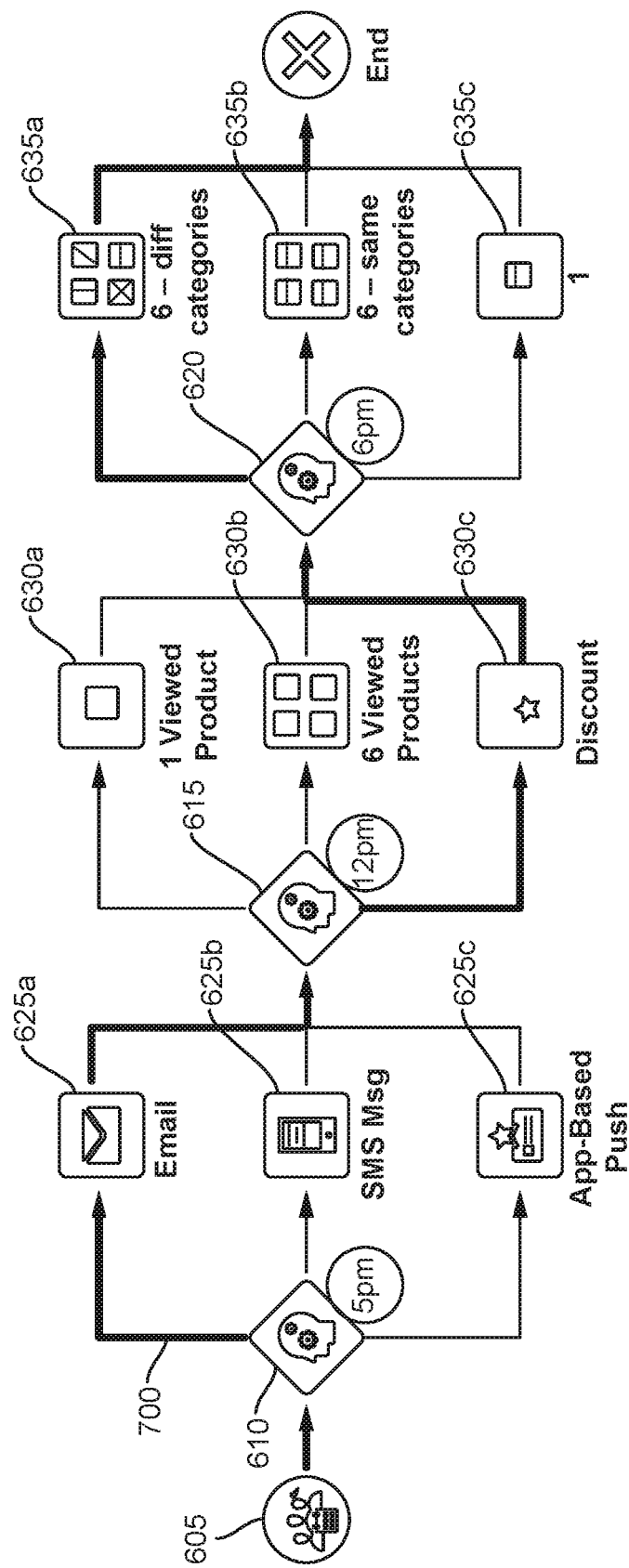
FIG. 7 illustrates an example of a trajectory corresponding to a user device and extending through a communication decision tree.

FIG. 7 illustrates an example of a trajectory 700 corresponding to a user device and extending through communication decision tree 600. In this instance, a machine-learning result made at first branching node 610 indicated that an email communication channel was to be used to send a notification, such that trajectory 700 extended to first action node 625a. An email notification is then transmitted to the user device. A request for email content is detected, indicating that a user is attempting to view the email, such that trajectory 700 extends to second branching node 615. There, a decision is made to include content that includes an identification of a discounts in the email. Thus, trajectory 700 extends to third notification content node 630c, and the corresponding content is transmitted to the user device.

A request for a webpage corresponding to a targeted link within the email is then detected, such that trajectory 700 extends to third branching node 620. A machine-learning result is generated that indicates that the webpage is to include content that identifies four representative products—each associated with a different category. Therefore, trajectory 700 extends to first email content node 635a, at which the corresponding webpage content is transmitted to the user device.

In the depicted instance, the decisions at the first branching node, the second branching node and the third branching node are indicated as having been made at 5 pm on a first day, 12 pm on a second day, and 6 pm on the second day.

Corresponding actions are then immediately performed. It will be appreciated that action times may further be decided in accordance with a machine-learning model execution, client rule or other technique.

It will be further appreciated that identifying the machine-learning-based decision can include implementing one or more additional constraints and/or factors. Alternatively or additionally, the machine-learning-based decision can be further modified based on one or more additional constraints and/or factors. For example, U.S. application Ser. No. 14/798,293, filed on Jul. 13, 2015, (which is hereby incorporated by reference in its entirety for all purposes) further details additional techniques to dynamically identify communication characteristics, which may be further combined with machine-learning techniques disclosed herein.

Various interfaces can provided that facilitate defining the communication decision tree and initializing various machine-learning models. Specifically, an interface can enable a client to define a structure of the communication decision tree and/or—for each decision node—one or more hyperparameters of a machine-learning model to be executed at the node. It will be noted that a machine-learning model can be defined based on one or more hyperparameters and one or more parameters. Each of the one or more hyperparameters includes a variable that is not learned via training of the machine-learning model, while the one or more parameters include one or more variables that are learned via training of the machine-learning model. Thus, an interface can be configured to allow a client to specify hyperparameters that indicate (for example) a number of branching nodes, actions corresponding to each branch connected to each branching node, other inter-node connections, one or more constraints to be observed during execution of individual machine-learning models, and so on.

Figure 8:
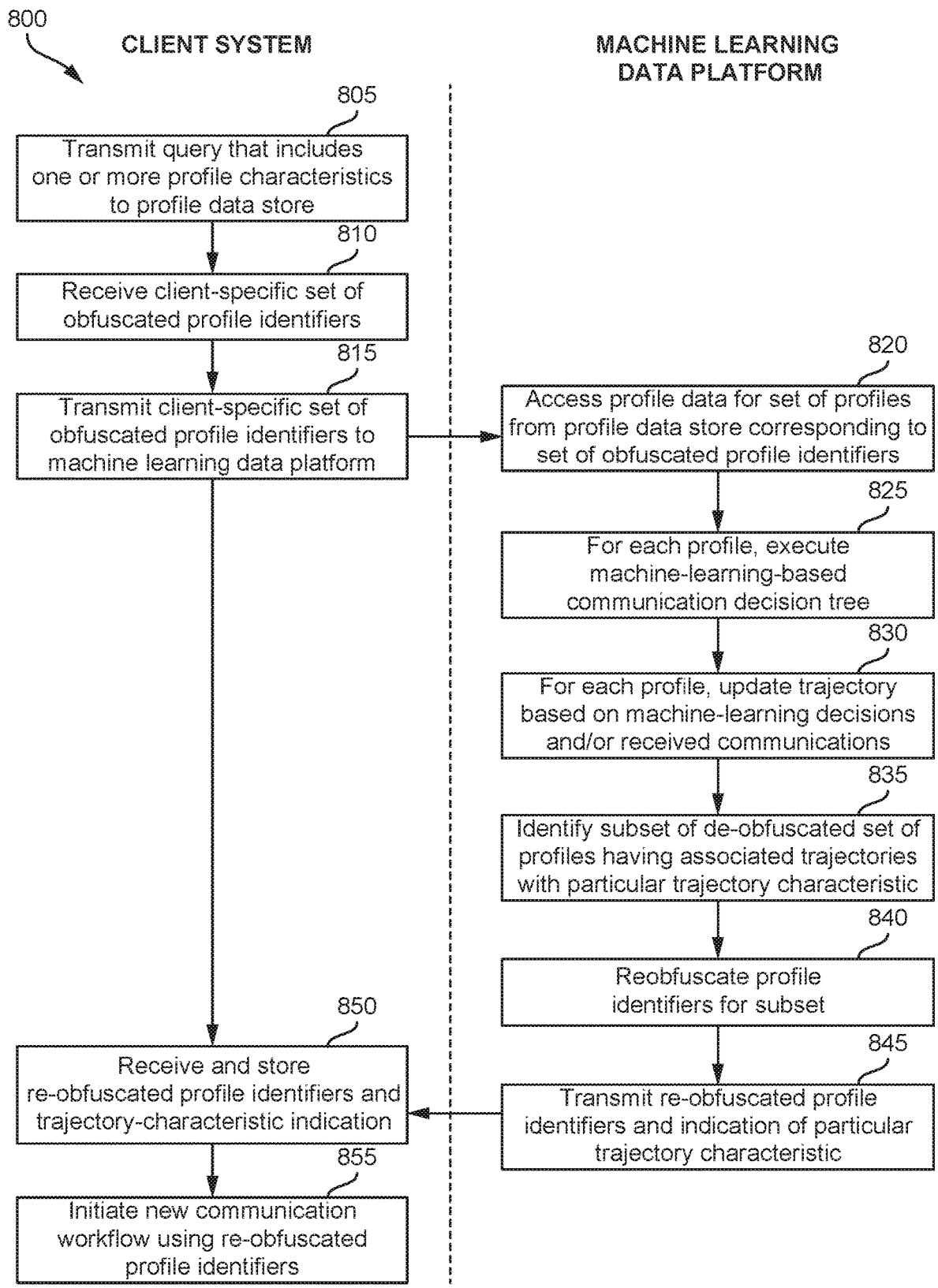
FIG. 8 shows a flowchart for a process for using machine-learning model execution to enrich obfuscated data and implement communication workflow according to embodiments of the invention.

FIG. 8 shows a flowchart for a process 800 for using machine-learning model execution to enrich obfuscated data and implement communication workflow according to embodiments of the invention.

Process 800 begins at block 805 where a client device transmits, to a data management system, a query that includes one or more profile characteristics to a data management system. The profile characteristics can include (for example) field values that correspond to demographic data, data characterizing the type of webpages with which a user interacted (e.g., in a particular manner), various types of webpage interactions (e.g., given different preceding events), values collected via input at one or more forms, etc.

The data management system may search profile data to identify a set of profiles for which each profile in the set has each of the one or more profile characteristics. In some instances, only the NPII data is queried. In some instances, all data (e.g., so as to include PII and NPII data) is queried. The data management system can generate a set of obfuscated identifiers that correspond to the profiles matching the characteristics. The data management system can maintain an association, for each obfuscated identifier of the set of obfuscated identifiers, between the obfuscated identifier and one or more of the underlying profile, the client system, and/or the query. The data management system can transmit the client-specific set of obfuscated profile identifiers to the client system, which can receive the set at block 810.

It will be appreciated that, in some instances, blocks 805-810 can be repeated multiple times for various profile characteristics. This can facilitate presentations at the client device of indications as to features of the sets, such as sizes of sets that correspond to different characteristics.

At block 815, the client device transmits the client-specific set of obfuscated profile identifiers (or a representation of the same) to a machine learning data platform. In some instances, block 815 includes providing login credentials for the data management system to the machine learning data platform.

At block 820, the machine learning data platform accesses at least part of the set of profiles from a profile data store maintained by the data management system. Accessing the profile data can include identifying, for each obfuscated profile identifier in the set of obfuscated profile identifiers, a de-obfuscated profile identifier. The de-obfuscated profile identifier can include an identifier that is used at the data management system to index the profile. In some instances, the machine learning data platform requests the de-obfuscated identifiers from the data management system by sending the data management system the client-specific set of obfuscated profile identifiers (e.g., along with client-identifying information). In some instances, the data management system identifies the de-obfuscated identifiers (e.g., and need not avail them to the machine learning data platform. For example, the machine-learning data platform may transmit an identification of a client system and/or query, such that the data management system can identify the set of corresponding de-obfuscated identifiers and/or absolute identifiers, such that corresponding profile data can be returned.

The at least part of the set of profiles can include (for example), for each of the identifiers within the client-specific set of obfuscated profile identifiers, profile information that corresponds to NPII data for the profile and client-associated PII data for the profile. In some instances, the accessed profile data further includes PII data associated with one or more other profiles. In some instances, block 820 includes identifying, for each of the set of obfuscated profile identifiers, a de-obfuscated profile identifier. For example, the machine learning data platform may send a request for profile data to the data management system with the set of obfuscated profile identifiers.

At block 825, a machine-learning based communication decision tree is executed for each profile. For example, one or more communication specifications can be identified using a machine-learning model (configured based on learned parameters) for each profile based on the accessed data, and a communication can be transmitted in accordance with the specification(s).

The machine learning data platform can monitor for an indication as to whether and/or how a user device has responded to (e.g., opened, activated a link within) the communication. Based on the communication and/or monitoring, at block 830, the machine learning model can update a trajectory associated with the profile. For example, the trajectory can first be advanced from an initial branching node to a branch node representing a particular one or more communication specifications and can then be advanced to another (e.g., branching) node selected based on whether a user responded to the communication (e.g., and/or based on a type of the response). Communications, monitoring and/or trajectory advancements may advance throughout the tree (e.g., potentially using multiple differentially configured other machine-learning models).

At block 835, a subset of the de-obfuscated set of profile identifiers is identified. Each profile represented in the subset may correspond to a particular trajectory characteristic. For example, the particular trajectory characteristic can include having an end of the trajectory at a particular node or at one of a set of particular nodes. As another example, the particular trajectory characteristic can include having progressed through one or more stages (e.g., represented by one or more event-detection nodes) and/or not having progressed through one or more other stages (e.g., represented by one or more other event-detection nodes). In some instances, multiple subsets are identified—each being associated with a different particular trajectory characteristic. The multiple subsets, collectively, may (but need not) combine to form the entire client-specific set of identifiers.

At block 840, each of the profile identifiers in the subset is re-obfuscated. For example, upon initially identifying the de-obfuscated identifiers, the machine learning data platform may have maintained a mapping between individual obfuscated identifier and a de-obfuscated identifier. As another example, the machine learning data platform may have performed actions and monitoring associated with a communication decision tree using the obfuscated identifiers, with only the data management system mapping the obfuscated identifiers to de-obfuscated identifiers. Thus, the re-obfuscated identifiers may correspond to the originally identified obfuscated identifiers.

At block 845, the machine learning data platform transmits, for each identifier in the subset, the re-obfuscated profile identifiers and indications of corresponding particular trajectory characteristics. For example, the transmission can include re-obfuscated identifiers in a subset that corresponds to having had an end of a trajectory that represents a particular communication stage. The transmission may (but need not) further include—in association with individual re-obfuscated identifiers—information collected during block 825 (e.g., representing an occurrence of a received and/or transmitted communication, a lack of a receipt of a communication, a characteristic of a received communication and/or content from a received communication).

At block 850, the client system can receive and store the re-obfuscated profile identifiers of the subset and the indication of the corresponding particular trajectory characteristics. For example, the client device may add a tag to profiles in the subset that indicate that the profiles correspond to a particular communication stage.

At block 855, a new communication workflow can be initiated for profiles corresponding to the re-obfuscated profile identifiers in the subset. For example, for each profile represented in the subset, a new communication can be transmitted to a corresponding user device. Another communication decision tree and/or configured machine-learning model may, but need not, be used to identify communication specifications.

The client device can use the subset data and trajectory characteristic(s) to explore population-level and profile-specific attributes of profiles associated with a particular trajectory characteristic. For example, in one instance, the machine learning data platform assigns each profile to a workflow stage depending on a node associated with an end of the profile's trajectory or whether the trajectory extended through or to a particular node. A subset can be defined for each workflow stage so as to include profile identifiers assigned to the stage. Existing or new profile data associated with the subset can be processed to identify, for individual fields, a distribution of, statistic for or listing of values for the field.

Figure 9:
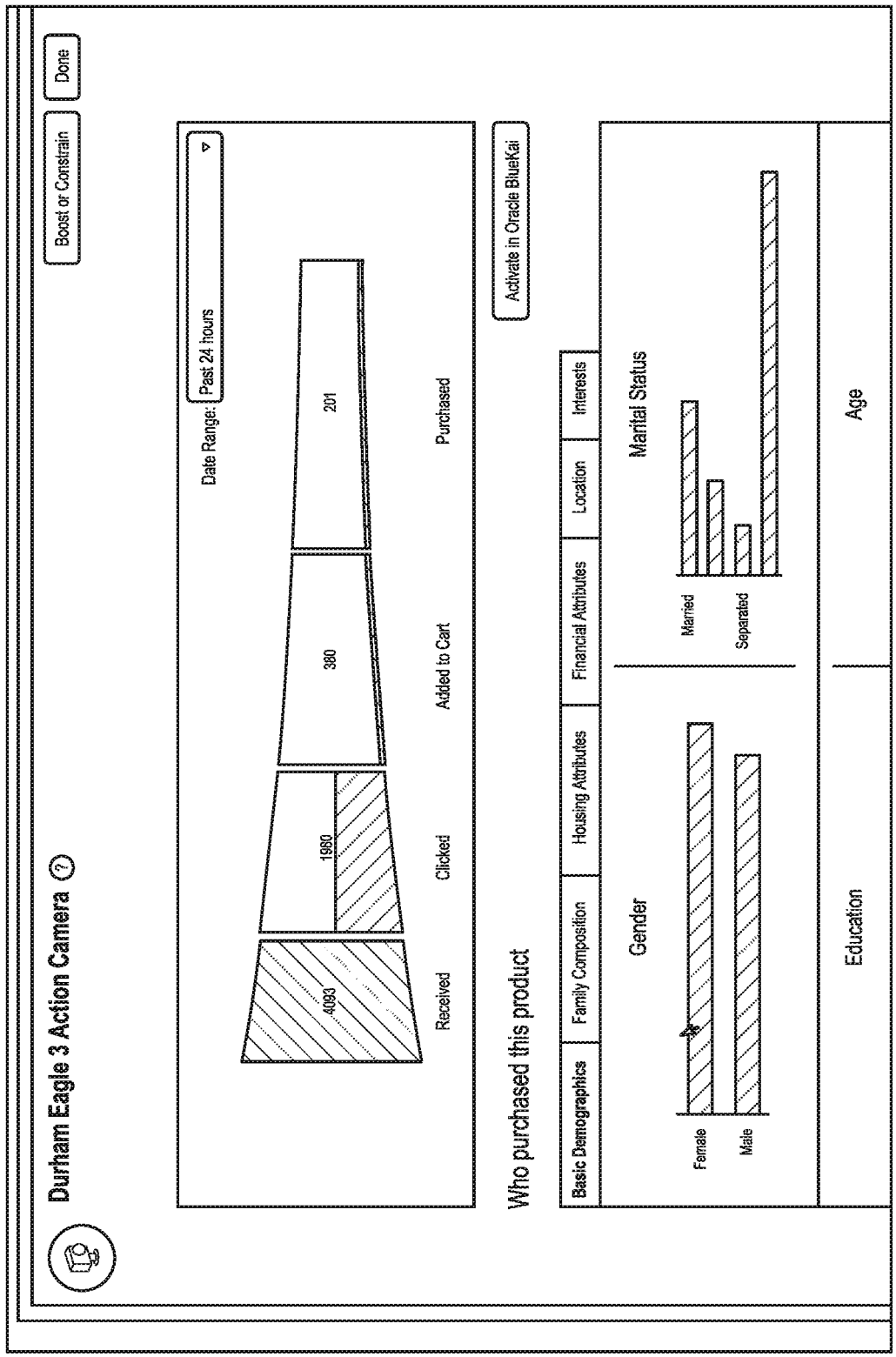
FIG. 9 shows an interface that represents population-level stage-specific profile data corresponding to individual workflow stages.

FIG. 9 shows an interface that represents population-level stage-specific profile data corresponding to individual workflow stages. In this instance, each successive stage corresponds to a subset of the profiles represented in a previous stage. The stages correspond to profiles associated with profile data indicating that a communication was received (first stage), that a link within the communication was clicked (second stage), that an interaction at the linked web site corresponding to adding a product to a cart (third stage), and that an interaction at the linked web site corresponding to purchasing a product (fourth stage).

In the depicted instance, the fourth stage is selected to trigger presentation of information related to profiles assigned to the stage. As shown, population-level distribution statistics pertaining to demographic fields (e.g., gender, marital status and age and education data in a lower portion of the interface that is not depicted) can be presented.

The interface further includes an "Activate" button. This button can allow a client to identify a user group (e.g., users having clicked on a link but not having adding a purchase to a cart) and to transmit data about those users to the data management system and/or can initiate defining a set of profiles on which to perform a new workflow processing.

Figure 10:
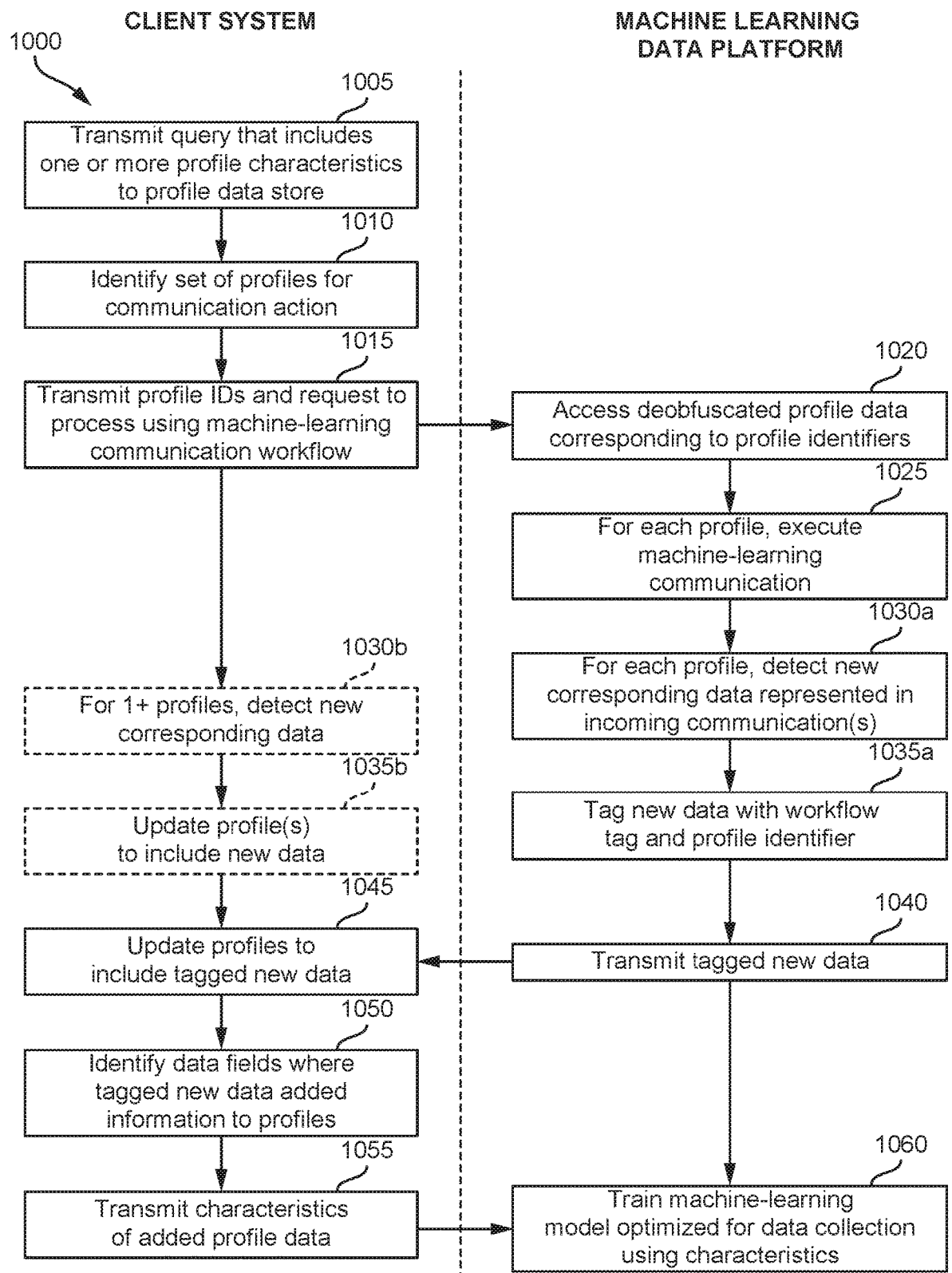
FIG. 10 shows a flowchart for a process for using machine-learning model execution to generate training data for data-enrichment training according to embodiments of the invention.

FIG. 10 shows a flowchart for a process 1000 for using machine-learning model execution to generate training data for data-enrichment training according to embodiments of the invention.

Process 1000 begins at block 1005 where a client device transmits, to a data management system, a query that includes one or more profile characteristics to a data management system. The profile characteristics can include (for example) field values that correspond to demographic data, data characterizing the type of webpages with which a user interacted (e.g., in a particular manner), various types of webpage interactions (e.g., given different preceding events), values collected via input at one or more forms, etc.

The data management system may search profile data to identify a set of profiles for which each profile in the set has each of the one or more profile characteristics. In some instances, only the NPII data is queried. In some instances, all data (e.g., so as to include PII and NPII data) is queried. The data management system can generate a set of obfuscated identifiers that correspond to the profiles matching the characteristics. The data management system can maintain an association, for each obfuscated identifier of the set of obfuscated identifiers, between the obfuscated identifier and one or more of the underlying profile, the client system, and/or the query. The data management system can transmit the client-specific set of obfuscated profile identifiers to the client system. Based on evaluation of one or more queries, the client system can identify, at block 1010, a set of profiles for communication action.

At block 1015, profile identifiers (e.g., obfuscated profile identifiers) for the set of profiles to a machine learning data platform. The transmission can include or otherwise correspond to a request to perform a processing using a machine-learning communication workflow. In some instances, block 1015 includes providing login credentials for the data management system to the machine learning data platform.

At block 1020, the machine learning data platform accesses at least part of the set of profiles from a profile data store maintained by the data management system. Accessing the profile data can include identifying, for each obfuscated profile identifier in the set of obfuscated profile identifiers, a de-obfuscated profile identifier. The de-obfuscated profile identifier can include an identifier that is used at the data management system to index the profile. In some instances, the machine learning data platform requests the de-obfuscated identifiers from the data management system by sending the data management system the client-specific set of obfuscated profile identifiers (e.g., along with client-identifying information). In some instances, the data management system identifies the de-obfuscated identifiers (e.g., and need not avail them to the machine learning data platform. For example, the machine-learning data platform may transmit an identification of a client system and/or query, such that the data management system can identify the set of corresponding de-obfuscated identifiers and/or absolute identifiers, such that corresponding profile data can be returned.

The at least part of the set of profiles can include (for example), for each of the identifiers within the client-specific set of obfuscated profile identifiers, profile information that corresponds to NPII data for the profile and client-associated PII data for the profile. In some instances, the accessed profile data further includes PII data associated with one or more other profiles. In some instances, block 820 includes identifying, for each of the set of obfuscated profile identifiers, a de-obfuscated profile identifier. For example, the machine learning data platform may send a request for profile data to the data management system with the set of obfuscated profile identifiers.

At block 1025, a machine-learning based communication decision tree is executed for each profile. For example, one or more communication specifications can be identified using a machine-learning model (configured based on learned parameters) for each profile based on the accessed data, and a communication can be transmitted in accordance with the specification(s). The machine-learning based communication decision tree can include one or more nodes that each correspond to a decision to be made using a machine-learning model configured based on training data to prioritize one or more variables (e.g., user engagement, conversion, communication opening, etc.) and/or by processing training data in view of a target outcome.

The machine learning data platform can monitor for an indication as to whether and/or how a user device has responded to (e.g., opened, activated a link within) the communication. At block 1030*a*, the machine learning data platform can detect new corresponding data represented in or by one or more incoming communications. The new corresponding data can be of a type tracked (e.g., at the client system or data management system) in one or more profiles. For example, an incoming communication may indicate a user action (e.g., having opened a notification, clicked on a link in the notification, interacted with a webpage in a particular manner, or provided particular form data). As another (additional or alternative) example, an incoming communication may include header data that identifies (for example) a type of device being used, a current location, a browsing history, etc. As yet another (additional or alternative) example, an incoming communication may explicitly identify new input having been provided by the user.

At block 1035*a*, the machine learning data platform tags the new data with a workflow tag so as to indicate that it was collected and/or detected as a result of the execution of the machine-learning communication workflow. In some instances, the tag more specifically indicates one or more communication specifications associated with one or more communications transmitted prior to receiving the new corresponding data. The new data can also be associated with a profile identifier (e.g., as identified based on a device identifier, user identifier or profile identifier detected in a communication or via use of profile-associated tracking links in transmitted communications).

The new corresponding data can be accessible to the machine learning data platform as a result of the execution of the machine-learning communication workflow. In some instances, the client system (at block 1030*b*) is also monitoring for an detecting new data corresponding to one or more of the profiles included in the set. The new corresponding data detected by the client system may have been detected based on events that are separate from and/or independent from actions associated with the machine-learning communication workflow. At block 1035*b*, the client system may update the one or more profiles (or cause the one or more profiles to be updated via an instruction to the data management system) with the new data. For example, one or more new field values may be added to each of the one or more profiles.

At block 1040, the machine learning data platform transmits the tagged new data to the client device. At block 1045, the client device updates each of the set of profiles (or causes each of the set of profiles to be updated) to include the tagged new data. For example, new tagged field values can be added to the profiles. It will be appreciated that, in some instances, new corresponding data is detected (at block 1030*a*), tagged (at block 1035*a*), transmitted (at block 1040) and/or used for profile updating for an incomplete subset of the set of profiles.

At block 1050, the client system can identify—for each profile—for which data fields the tagged new data was informative to the existing profile. The identification can include (for example) performing a de-duplication process to delete a tagged field value when it is a duplicate of an untagged field value and then identifying the fields for the remaining tagged field values.

For example, the machine learning data platform may have identified three new field values for a given profile that were not represented in the accessed profile data. However, through separate or independent channels, the client system may have separately identified field values for two of three fields corresponding to the new data. One of the client-identified field values may match a corresponding first tagged field value and one of the client-identified field values may differ from corresponding second tagged field value. The client system may use one or more rules to determine how to further update the profile. For example, the tag may be removed from a third tagged value in the profile. With regard to a field corresponding to the differing client-identified and tagged field values, a rule may indicate that neither field value is to be included as a field value, both field values are to be included, that the client-identified value is to prevail in being included over the tagged value, that the tagged value is to prevail in being included over the client-identified value, that a more recently identified of the tagged or client-identified value is to be included, etc. Thus, depending on how differing field values are processed, the client system may determine that the machine-learning communication workflow produced new information pertaining to one or two fields.

At block 1055, the client system transmits characteristics of the added profile data to the machine learning data platform. The characteristics may identify (for example) for which types of fields the tagged data included new information for inclusion in profiles.

In some instances, one or more of blocks 1030*b*, 1035*b*, 1045, 1050 and 1055 may be performed at the data management system. The data management system can (at block 1050) then determine, for example, which data fields add information based on field values present in a profile that are characterized as NPII field values and/or client-specific PII field values associated with the client system (thereby indicating which field values add to information accessible to the client system). In some instances, a same or different determination identifies which data fields are informative relative to all existing profile data for the profile (further including PII associated with one or more other clients).

At block 1060, the machine learning data platform can use the characteristics to train a configuration of one or more machine-learning models. The configuration(s) can be associated with a prioritization of information collection (e.g., instead of conversion, communication opening, initiation of a web session, etc.) or a target outcome of collecting new data that is (and will be, at a time that the new data is communicated to a client system) unrepresented in a profile. It will be appreciated that the configuration(s) of the machine-learning model(s) used during the execution at block 1025 may, but need not, have had a different training prioritization and/or a different target outcome.

It will be appreciated that variations of the disclosed techniques are contemplated. For example, a branching node may use another type of artificial-intelligence model that is not a machine-learning model to select a communication specification to be used for a communication. As another example, an interface may be configured to accept a selection of a particular type or a more general type of artificial-intelligence model that is to be used at a trajectory stage corresponding to a switch element. As yet another example, an interface may be configured to allow an indication of what data (e.g., in terms of corresponding to one or more communication decision trees, one or more time periods, and/or one or more user-population segments) is to be used to train a machine-learning model corresponding to one, more or all switch elements positioned on a canvas.

It will further be appreciated that, while some disclosures herein indicate that a target outcome can be used to shape machine-learning training and execution, more complicated instances are considered. For example, a negative outcome (e.g., an unsubscribe request or complaint) can alternatively or additionally be identified and used. In some instances, a score can be assigned to various results based on a quantity or extent to which one or more target results and/or one or more negative results occurred. The score can then be used for training and implementing one or more machine-learning models.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
   receiving, from a client system, a request to perform a machine-learning communication workflow;
   receiving, in association with the request, a set of obfuscated identifiers for which processing via the machine-learning communication workflow is requested, wherein each obfuscated identifier of the set of obfuscated identifiers corresponds to an identification of an obfuscated version of a profile stored at a data management system, the obfuscated version lacking personally identifiable information (PII);

for each obfuscated identifier in the set of obfuscated identifiers:
  mapping the obfuscated identifier to a non-obfuscated identifier that identifies a non-obfuscated version of the profile that includes PII;
  retrieving, from the data management system, user data from the non-obfuscated version;
  retrieving learned data generated by training a machine-learning model using other user data;
  executing the machine-learning model configured with the learned data to process at least part of the user data;
  identifying one or more communication specifications based on the execution of the machine-learning model configured with the learned data;
  causing content to be transmitted to a destination address identified in the user data in accordance with the one or more communication specifications, wherein a time of the content transmission, a type of communication transmission used for the content transmission and/or part or all of the content correspond to the one or more communication specifications; and
  generating non-obfuscated communication-activity data for the non-obfuscated profile identifier based on any communications detected in response to the content transmission;
obfuscating the non-obfuscated communication-activity data to generate a set of obfuscated data for the set of obfuscated identifiers;
transmitting at least part of the set of obfuscated data to the client system; and
causing, for each of at least some of the set of obfuscated identifiers, at least some of the non-obfuscated communication-activity data to be stored in association with the non-obfuscated profile identifier to the data management system.

2. The method of claim 1, further comprising:
accessing a data structure representing a communication decision tree configured to dynamically define individual trajectories through the communication decision tree using a machine-learning technique to indicate a series of communication specifications, the communication decision tree including a set of branching nodes, each branching node of the set of branching nodes corresponding to an action point configured to identify a direction for a given trajectory; and
for each obfuscated identifier in the set of obfuscated identifiers, prior to executing the machine-learning model:
  initiating a trajectory;
  detecting that the trajectory has reached a particular branching node of the set of branching nodes, the particular branching node being connected to multiple other nodes, each of the next nodes corresponding to at least one communication specification;
  wherein a result of the execution of the machine-learning model configured with the learning data corresponds to a selection of a particular other node of the multiple other nodes, the at least one communication specification corresponding to the particular next node including the identified one or more communication specifications.

3. The method of claim 2, further comprising, for each obfuscated identifier in the set of obfuscated identifiers:
  determining, based at least in part on the any communications detected in response to the content transmission, whether and/or how to advance the trajectory;
  when it is determined that the trajectory is to be advanced, advancing the trajectory;
  identifying a last node of the trajectory; and
  assigning the trajectory to a communication stage of a set of communication stages based on the last node,
  wherein the at least part of the set of obfuscated data includes an identification of a particular communication stage of the set of communication stages and a subset of the set of obfuscated identifiers, each obfuscated identifier in the subset having had a trajectory assigned to the particular communication stage.

4. The method of claim 2, further comprising, for each obfuscated identifier of at least some of the set of obfuscated identifiers:
  detecting a request communication responsive to the content transmission, the request communication requesting other content;
  advancing the trajectory to another particular branching node of the set of branching nodes;
  retrieving other learned data generated by training another iteration of the machine-learning model;
  executing the other iteration of the machine-learning model configured with the other learned data to process another at least part of the user data;
  identifying one or more other communication specifications based on the execution of the other iteration of the machine-learning model configured with the other learned data; and
  causing other content to be transmitted to the destination address in accordance with the one or more other communication specifications,
  wherein the any communications detected in response to the content transmission includes any communication detected in response to the other content transmission.

5. The method of claim 1, further comprising, for each obfuscated identifier of at least some of the set of obfuscated identifiers:
  receiving one or more new communications, each of the one or more new communications having been transmitted from a user device in response to the content transmission or to another content transmission transmitted as part of the machine-learning communication workflow; and
  extracting field values from the one or more new communications, wherein the at least part of the set of obfuscated data includes the extracted field values in association with the obfuscated identifier.

6. The method of claim 5, further comprising:
  receiving one or more indications as to which of the extracted field values added information to the obfuscated versions of the profiles associated with the set of obfuscated identifiers; and
  training an implementation of the machine-learning model using the one or more indications, the implementation of the machine-learning model being configured to prioritize informative data collection.

7. The method of claim 1, wherein the learned data includes one or more parameters corresponding to a regression model, and wherein the machine-learning model includes the regression model.

8. A computer-program product tangibly embodied in a non-transitory machine-readable storage medium, including instructions configured to cause one or more data processors to perform operations including:

receiving, from a client system, a request to perform a machine-learning communication workflow;

receiving, in association with the request, a set of obfuscated identifiers for which processing via the machine-learning communication workflow is requested, wherein each obfuscated identifier of the set of obfuscated identifiers corresponds to an identification of an obfuscated version of a profile stored at a data management system, the obfuscated version lacking personally identifiable information (PII);

for each obfuscated identifier in the set of obfuscated identifiers:
- mapping the obfuscated identifier to a non-obfuscated identifier that identifies a non-obfuscated version of the profile that includes PII;
- retrieving, from the data management system, user data from the non-obfuscated version;
- retrieving learned data generated by training a machine-learning model using other user data;
- executing the machine-learning model configured with the learned data to process at least part of the user data;
- identifying one or more communication specifications based on the execution of the machine-learning model configured with the learned data;
- causing content to be transmitted to a destination address identified in the user data in accordance with the one or more communication specifications, wherein a time of the content transmission, a type of communication transmission used for the content transmission and/or part or all of the content correspond to the one or more communication specifications; and
- generating non-obfuscated communication-activity data for the non-obfuscated profile identifier based on any communications detected in response to the content transmission;

obfuscating the non-obfuscated communication-activity data to generate a set of obfuscated data for the set of obfuscated identifiers;

transmitting at least part of the set of obfuscated data to the client system; and causing, for each of at least some of the set of obfuscated identifiers, at least part of the non-obfuscated communication-activity data to be stored in association with the non-obfuscated profile identifier to the data management system.

9. The computer-program product of claim 8, wherein the operations further include:
- accessing a data structure representing a communication decision tree configured to dynamically define individual trajectories through the communication decision tree using a machine-learning technique to indicate a series of communication specifications, the communication decision tree including a set of branching nodes, each branching node of the set of branching nodes corresponding to an action point configured to identify a direction for a given trajectory; and
- for each obfuscated identifier in the set of obfuscated identifiers, prior to executing the machine-learning model:
  - initiating a trajectory;
  - detecting that the trajectory has reached a particular branching node of the set of branching nodes, the particular branching node being connected to multiple other nodes, each of the next nodes corresponding to at least one communication specification;
  - wherein a result of the execution of the machine-learning model configured with the learning data corresponds to a selection of a particular other node of the multiple other nodes, the at least one communication specification corresponding to the particular next node including the identified one or more communication specifications.

10. The computer-program product of claim 9, wherein the operations further include, for each obfuscated identifier in the set of obfuscated identifiers:
- determining, based at least in part on the any communications detected in response to the content transmission, whether and/or how to advance the trajectory;
- when it is determined that the trajectory is to be advanced, advancing the trajectory;
- identifying a last node of the trajectory; and
- assigning the trajectory to a communication stage of a set of communication stages based on the last node,
- wherein the at least part of the set of obfuscated data includes an identification of a particular communication stage of the set of communication stages and a subset of the set of obfuscated identifiers, each obfuscated identifier in the subset having had a trajectory assigned to the particular communication stage.

11. The computer-program product of claim 9, wherein the operations further include, for each obfuscated identifier of at least some of the set of obfuscated identifiers:
- detecting a request communication responsive to the content transmission, the request communication requesting other content;
- advancing the trajectory to another particular branching node of the set of branching nodes;
- retrieving other learned data generated by training another iteration of the machine-learning model;
- executing the other iteration of the machine-learning model configured with the other learned data to process another at least part of the user data;
- identifying one or more other communication specifications based on the execution of the other iteration of the machine-learning model configured with the other learned data; and
- causing other content to be transmitted to the destination address in accordance with the one or more other communication specifications,
- wherein the any communications detected in response to the content transmission includes any communication detected in response to the other content transmission.

12. The computer-program product of claim 8, wherein the operations further include, for each obfuscated identifier of at least some of the set of obfuscated identifiers:
- receiving one or more new communications, each of the one or more new communications having been transmitted from a user device in response to the content transmission or to another content transmission transmitted as part of the machine-learning communication workflow; and
- extracting field values from the one or more new communications, wherein the at least part of the set of obfuscated data includes the extracted field values in association with the obfuscated identifier.

13. The computer-program product of claim 12, wherein the operations further include:
- receiving one or more indications as to which of the extracted field values added information to the obfuscated versions of the profiles associated with the set of obfuscated identifiers; and training an implementation of the machine-learning model using the one or more indications, the implementation of the machine-learning model being configured to prioritize informative data collection.

14. The computer-program product of claim 8, wherein the learned data includes one or more parameters corresponding to a regression model, and wherein the machine-learning model includes the regression model.

15. A system comprising:
one or more data processors; and
a non-transitory computer readable storage medium containing instructions which, when executed on the one or more data processors, cause the one or more data processors to perform operations including:
  receiving, from a client system, a request to perform a machine-learning communication workflow;
  receiving, in association with the request, a set of obfuscated identifiers for which processing via the machine-learning communication workflow is requested, wherein each obfuscated identifier of the set of obfuscated identifiers corresponds to an identification of an obfuscated version of a profile stored at a data management system, the obfuscated version lacking personally identifiable information (PII);
  for each obfuscated identifier in the set of obfuscated identifiers:
    mapping the obfuscated identifier to a non-obfuscated identifier that identifies a non-obfuscated version of the profile that includes PII;
    retrieving, from the data management system, user data from the non-obfuscated version;
    retrieving learned data generated by training a machine-learning model using other user data;
    executing the machine-learning model configured with the learned data to process at least part of the user data;
    identifying one or more communication specifications based on the execution of the machine-learning model configured with the learned data;
    causing content to be transmitted to a destination address identified in the user data in accordance with the one or more communication specifications, wherein a time of the content transmission, a type of communication transmission used for the content transmission and/or part or all of the content correspond to the one or more communication specifications; and
    generating non-obfuscated communication-activity data for the non-obfuscated profile identifier based on any communications detected in response to the content transmission;
  obfuscating the non-obfuscated communication-activity data to generate a set of obfuscated data for the set of obfuscated identifiers;
  transmitting at least part of the set of obfuscated data to the client system; and
  causing, for each of at least some of the set of obfuscated identifiers, at least some of the non-obfuscated communication-activity data to be stored in association with the non-obfuscated profile identifier to the data management system.

16. The system of claim 15, wherein the operations further include:
  accessing a data structure representing a communication decision tree configured to dynamically define individual trajectories through the communication decision tree using a machine-learning technique to indicate a series of communication specifications, the communication decision tree including a set of branching nodes, each branching node of the set of branching nodes corresponding to an action point configured to identify a direction for a given trajectory; and
  for each obfuscated identifier in the set of obfuscated identifiers, prior to executing the machine-learning model:
    initiating a trajectory;
    detecting that the trajectory has reached a particular branching node of the set of branching nodes, the particular branching node being connected to multiple other nodes, each of the next nodes corresponding to at least one communication specification;
    wherein a result of the execution of the machine-learning model configured with the learning data corresponds to a selection of a particular other node of the multiple other nodes, the at least one communication specification corresponding to the particular next node including the identified one or more communication specifications.

17. The system of claim 16, wherein the operations further include, for each obfuscated identifier in the set of obfuscated identifiers:
  determining, based at least in part on the any communications detected in response to the content transmission, whether and/or how to advance the trajectory;
  when it is determined that the trajectory is to be advanced, advancing the trajectory;
  identifying a last node of the trajectory; and
  assigning the trajectory to a communication stage of a set of communication stages based on the last node,
  wherein the at least part of the set of obfuscated data includes an identification of a particular communication stage of the set of communication stages and a subset of the set of obfuscated identifiers, each obfuscated identifier in the subset having had a trajectory assigned to the particular communication stage.

18. The system of claim 16, wherein the operations further include, for each obfuscated identifier of at least some of the set of obfuscated identifiers:
  detecting a request communication responsive to the content transmission, the request communication requesting other content;
  advancing the trajectory to another particular branching node of the set of branching nodes;
  retrieving other learned data generated by training another iteration of the machine-learning model;
  executing the other iteration of the machine-learning model configured with the other learned data to process another at least part of the user data;
  identifying one or more other communication specifications based on the execution of the other iteration of the machine-learning model configured with the other learned data; and
  causing other content to be transmitted to the destination address in accordance with the one or more other communication specifications,
  wherein the any communications detected in response to the content transmission includes any communication detected in response to the other content transmission.

19. The system of claim 15, wherein the operations further include, for each obfuscated identifier of at least some of the set of obfuscated identifiers:
  receiving one or more new communications, each of the one or more new communications having been transmitted from a user device in response to the content transmission or to another content transmission transmitted as part of the machine-learning communication workflow; and extracting field values from the one or more new communications, wherein the at least part of the set of obfuscated data includes the extracted field values in association with the obfuscated identifier.

20. The system of claim 15, wherein the operations further include:

receiving one or more indications as to which of the extracted field values added information to the obfuscated versions of the profiles associated with the set of obfuscated identifiers; and training an implementation of the machine-learning model using the one or more indications, the implementation of the machine-learning model being configured to prioritize informative data collection.

\* \* \* \* \*